US012371315B2

(12) United States Patent
Veloz et al.

(10) Patent No.: US 12,371,315 B2
(45) Date of Patent: Jul. 29, 2025

(54) BEVERAGE DISPENSING SYSTEM

(71) Applicant: Automatic Bar Controls, Inc., Vacaville, CA (US)

(72) Inventors: Silas Veloz, Vacaville, CA (US); Ronak Ghandriz, Vacaville, CA (US); Gabriel Dial, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 13 days.

(21) Appl. No.: 18/134,927

(22) Filed: Apr. 14, 2023

(65) Prior Publication Data

US 2023/0331532 A1 Oct. 19, 2023

Related U.S. Application Data

(60) Provisional application No. 63/331,169, filed on Apr. 14, 2022.

(51) Int. Cl.
*B67D 1/00* (2006.01)
*B67D 1/12* (2006.01)

(52) U.S. Cl.
CPC ......... *B67D 1/0084* (2013.01); *B67D 1/1202* (2013.01); *B67D 2001/0088* (2013.01); *B67D 2210/00034* (2013.01)

(58) Field of Classification Search
CPC .. B67D 1/0044; B67D 1/0084; B67D 1/0086; B67D 1/005; B67D 1/0021; B67D 1/0085; B67D 1/0052
USPC ................................ 222/129.1, 144.5, 145.5
See application file for complete search history.

(56) References Cited

U.S. PATENT DOCUMENTS

| | | | | |
|---|---|---|---|---|
| D274,031 S | | 5/1984 | de Man | |
| 4,497,421 A | | 2/1985 | Schilling | |
| 4,509,690 A | * | 4/1985 | Austin | B01F 25/46 222/129.1 |
| 4,673,108 A | * | 6/1987 | de Man | B67D 1/0084 439/43 |
| 4,741,355 A | * | 5/1988 | Credle, Jr. | B67D 1/0082 251/75 |
| 4,921,140 A | * | 5/1990 | Belcham | B67D 1/0084 200/332.2 |
| D309,232 S | | 7/1990 | Valiyee et al. | |
| 5,042,692 A | | 8/1991 | Valiyee et al. | |

(Continued)

OTHER PUBLICATIONS

Notice of Allowance dated Feb. 22, 2024 in related U.S. Appl. No. 29/834,927 (eleven pages).

(Continued)

*Primary Examiner* — Charles P. Cheyney
(74) *Attorney, Agent, or Firm* — Kilpatrick Townsend & Stockton LLP

(57) ABSTRACT

Embodiments provide a beverage dispensing mechanism that is configured to dispense a beverage at a flow rate of at least 2.5 oz/sec. The beverage dispensing mechanism includes a flow control module (including a top plate, a plurality of buttons coupled to the top plate, and a plurality of tube subassemblies), a handle, a nozzle module (including a nozzle, and a diffuser formed of a diffuser base and a water diffuser) and a split heel cover that fits over the tube subassemblies. In some embodiments, the flow control module may be snap-fitted on the handle. The modular design of the beverage dispenser allows for ease of repair and replacement of various components.

14 Claims, 23 Drawing Sheets

(56) References Cited

U.S. PATENT DOCUMENTS

| | | | | |
|---|---|---|---|---|
| 5,082,240 | A * | 1/1992 | Richmond | F16K 31/404 138/45 |
| 5,269,442 | A * | 12/1993 | Vogel | B67D 1/0044 239/590.5 |
| 5,855,355 | A * | 1/1999 | Grunert | G05D 7/0113 251/118 |
| D626,373 | S * | 11/2010 | Valiyee | D7/397 |
| D628,014 | S | 11/2010 | Martindale | |
| D638,659 | S | 5/2011 | Martindale et al. | |
| D666,869 | S | 9/2012 | Martindale et al. | |
| D697,753 | S | 1/2014 | Brown | |
| D717,590 | S | 11/2014 | Bond | |
| D717,591 | S | 11/2014 | Bond | |
| D717,592 | S | 11/2014 | Bond | |
| D717,593 | S | 11/2014 | Bond | |
| D758,795 | S | 6/2016 | Bond et al. | |
| D786,616 | S | 5/2017 | Brown | |
| 10,035,694 | B1 | 7/2018 | Broen et al. | |
| 10,507,479 | B2 * | 12/2019 | Bertness | B01F 33/84 |
| 10,759,645 | B2 * | 9/2020 | Aslam | B67D 1/005 |
| 11,325,818 | B2 * | 5/2022 | Dahlberg | B67D 1/1272 |
| 11,345,584 | B2 | 5/2022 | Martin et al. | |
| D957,187 | S | 7/2022 | Behe et al. | |
| D987,367 | S | 5/2023 | Dsouza et al. | |
| D987,368 | S | 5/2023 | Dsouza et al. | |
| D987,369 | S | 5/2023 | Dsouza et al. | |
| D987,370 | S | 5/2023 | Dsouza et al. | |
| 11,912,558 | B2 * | 2/2024 | Augsburger | B67D 1/0046 |
| 2006/0086399 | A1 * | 4/2006 | Bailey | G05D 7/0106 138/44 |
| 2008/0232090 | A1 | 9/2008 | Hecht | |
| 2009/0084817 | A1 * | 4/2009 | Schroeder | B67D 1/0084 222/144.5 |
| 2012/0325855 | A1 | 12/2012 | Brown et al. | |
| 2013/0048674 | A1 | 2/2013 | Baker et al. | |
| 2016/0060090 | A1 | 3/2016 | Hecht et al. | |
| 2016/0176696 | A1 | 6/2016 | Hecht et al. | |
| 2016/0282883 | A1 | 9/2016 | Smeller | |
| 2019/0039873 | A1 | 2/2019 | Aslam et al. | |
| 2021/0276855 | A1 | 9/2021 | Arora et al. | |
| 2021/0380389 | A1 | 12/2021 | Martin et al. | |
| 2023/0331532 | A1 | 10/2023 | Veloz et al. | |
| 2023/0399220 | A1 | 12/2023 | Martin et al. | |
| 2023/0399221 | A1 | 12/2023 | Rodriguez et al. | |

OTHER PUBLICATIONS

Office Action dated Nov. 7, 2022 in related Great Britain application No. 6236967 (two pages).

Notice of Allowance dated May 22, 2023 in related Japanese patent application No. 2022-022123 (one page).

Office Action dated May 8, 2023 in related Korean Application No. 30-2022-0042058 (two pages).

Decision to Grant dated Jul. 4, 2023 in related Korean Application No. 30-2022-0042058 (three pages).

International Search Report and Written Opinion of the International Searching Authority dated Jul. 25, 2023 in related PCT/US2023/065804 (ten pages).

* cited by examiner

SECTION A-A

BEVERAGE DISPENSING SYSTEM

RELATED APPLICATIONS

This application claims the benefit of U.S. Provisional Patent Application No. 63/331,169, filed on Apr. 14, 2022, entitled "BEVERAGE DISPENSING SYSTEM," the disclosure of which are hereby incorporated by reference in their entireties for all purposes.

BACKGROUND

Conventional beverage dispensing systems are commonly used in a wide variety of locales, including restaurants, snack bars, convenience stores, movie theaters, and any business where beverages are served. These beverage dispensing systems often dispense a variety of beverages of differing types of beverages and flavors, such as flavored carbonated sodas, iced tea, water, or even alcoholic beverages. Typically, such devices use a post mix dispenser that mixes a beverage additive (e.g., a flavored syrup) with a base beverage fluid (e.g., water or soda) before dispensing through a dispense nozzle into a beverage container. have The desire to continue to improve the performance of the beverage dispensers, also knows as bar guns, remains a driving force to overcome the limitations of known bar gun systems.

SUMMARY

Embodiments provide an improved beverage dispensing system that reduces foaming and improves flow of fluids flowing through a multi-layered flow track system embedded within the handle of the beverage dispensing system. According to various embodiments, the flow rate of the fluids dispensed at the nozzle of the beverage dispenser is at least 2.5 oz./sec, which is higher than the flow rate of conventional beverage dispensers. Embodiments provide higher performance in terms of carbonation, foaming and stratification, and carry over. For example, cup carbonation may be greater than or equal to 3.45 volume $CO_2$, the foam height may be less than 1 inch, and the stratification (which is measured by Degree Brix) may be less than 1.0° Brix variation. A volume may refer to the space that the $CO_2$ would take up at a standard temperature (e.g., 32° F.) and at one atmosphere of pressure if removed from the beverage. In other words, it is the amount of $CO_2$ dissolved in the beverage relative to the beverage volume.

Embodiments provide a modular beverage dispenser comprising a handle enclosing a plurality of flow tracks and including a dispensing surface comprising a handle base fluid outlet. The modular beverage dispenser further comprises a flow control module coupled to a top surface of the handle, the flow control module includes a plurality of buttons configured to control flow through one or more of the plurality of flow tracks to form a beverage. The modular beverage dispenser also comprises a nozzle module coupled to the dispensing surface of the handle. The nozzle module includes a nozzle including an opening for dispensing the beverage, and a diffuser assembly provided within a cavity of the nozzle. The diffuser assembly includes a diffuser base permanently attached to the dispensing surface of the handle, and a water diffuser seated into the handle base fluid outlet through the diffuser base. The water diffuser comprises an elongated neck configured to fit into a central opening of the diffuser base, a first tapered surface provided at a first end of the elongated neck, a second tapered surface provided below the first tapered surface, and a set of angled outlets configured dispense water, provided along the first tapered surface.

In some embodiments, the modular beverage dispenser further comprises a plurality of handle outlets provided around the handle base fluid outlet, and a plurality of diffuser channels arranged around a central opening of the diffuser base. Each diffuser channel extends between a diffuser inlet and a diffuser outlet, wherein each diffuser inlet is in fluid connection with a handle outlet of the plurality of handle outlets. The modular beverage dispenser further comprises a plurality of elongated diffuser flow inserts. Each elongated diffuser flow insert is provided within a diffuser channel of the diffuser base. The plurality of elongated diffuser flow inserts extend around the water diffuser within an internal cavity of the nozzle. According to various embodiments, the plurality of elongated diffuser flow inserts extend past a bottom surface of the water diffuser such that an output of the plurality of elongated diffuser flow inserts is downstream from an output of the water diffuser.

Embodiments further provide a tube collector that is configured to be releasably coupled to a manifold. When portions of the tube collector and/or the manifold need to be serviced, they could easily be decoupled from each other. The manifold may in turn be coupled to a plurality of fluid sources. Accordingly, the tube collector may effectively couple the plurality of fluid sources to a beverage dispenser.

Embodiments provide a tube collector mechanism comprising a release mechanism, a tube collector having an angular housing formed by a top cover and a base cover that enclose the release mechanism therebetween, and a lever including a handle provided above the top cover of the angular housing, and a guide arm that extends through an opening on the top cover of the angular housing. The guide arm of the lever is coupled to the release mechanism. The lever and the release mechanism form a disconnect mechanism that, when activated, moves forward extending away from a front end of the tube collector. In some embodiments, the tube collector mechanism further comprises a manifold tray releasably coupled to the front end of the tube collector. The disconnect mechanism, when activated, disconnects the tube collector from the manifold tray by pushing the manifold tray or the tube collector away from each other. In some embodiments, one or more tabs are provided on a first end of the manifold tray, The one or more tabs extend through one or more tab slots provided on the base cover of the tube collector to connect with the release mechanism. The release mechanism, when activated, pushes on the one or more tabs to disconnect the tube collector from the manifold tray.

DETAILED DESCRIPTION

Beverage Dispenser

Figure 1A:
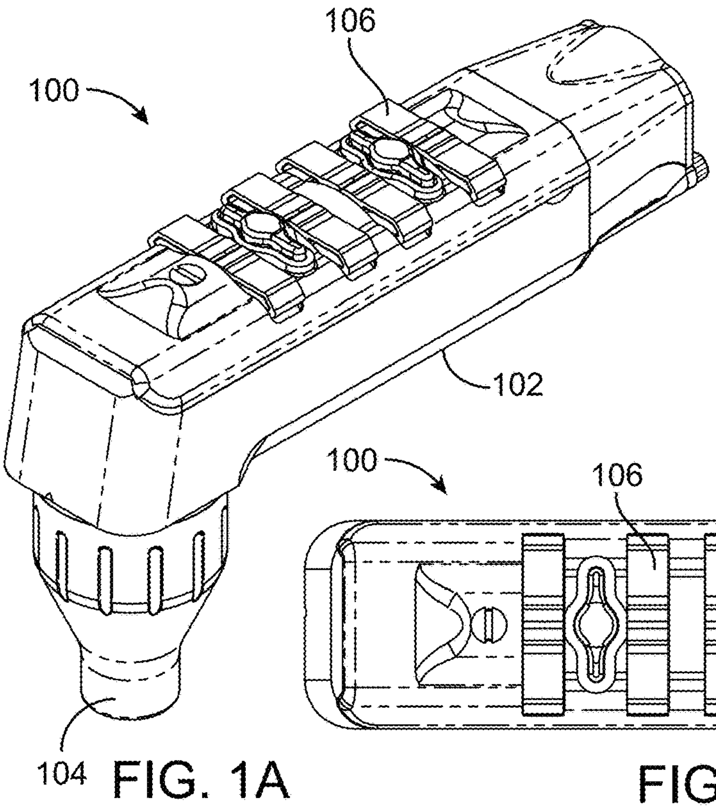
FIGS. 1A, 1B, 1C, 1D and 1E illustrate a perspective view, a top view, a side view, a back view and a bottom view of an exemplary modular beverage dispenser, respectively, according to various embodiments.
Figure 1B:
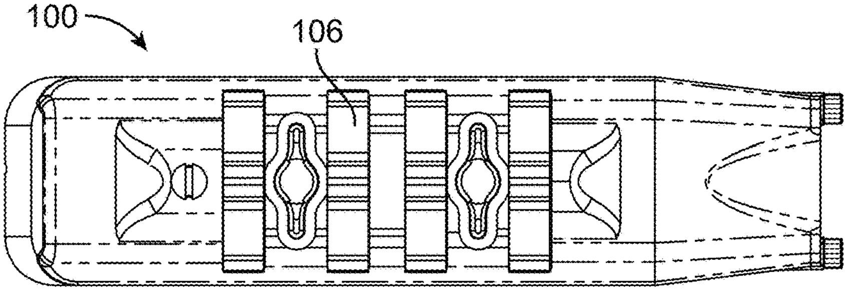
Figure 1C:
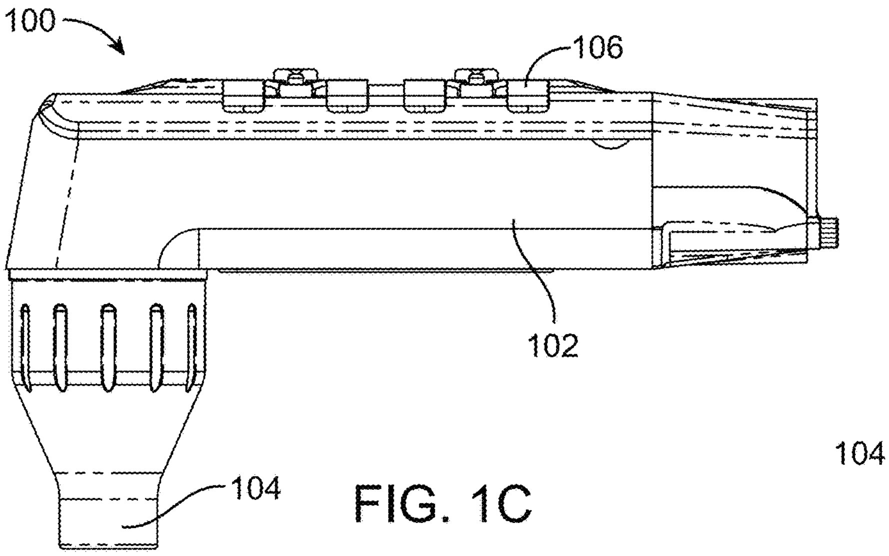
Figure 1D:
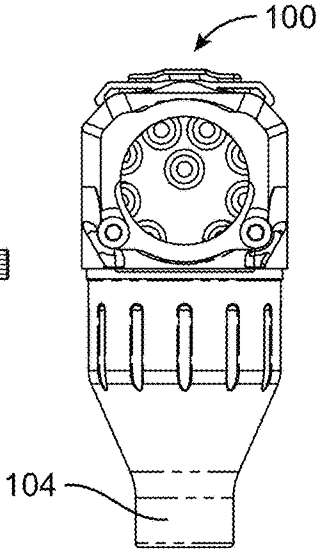
Figure 1E:
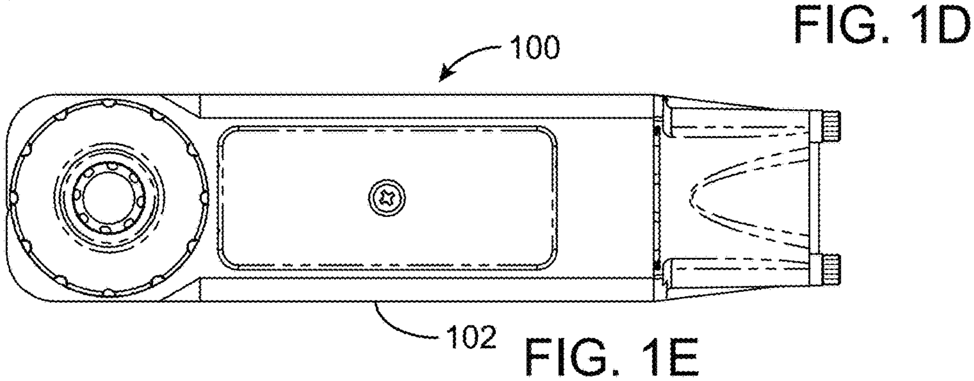

Embodiments provide a modular beverage dispensing apparatus (e.g., a beverage dispenser) that reduces foaming and improves flow of fluids flowing through a multi-layered (e.g., a 4 or 5-layered) flow track system embedded within the handle of the beverage dispenser. According to various embodiments, the flow rate of the fluids dispensed at the nozzle of the beverage dispenser is at least 2.5 oz./sec, which is higher than the flow rate of conventional beverage dispensers. Embodiments provide higher performance in terms of carbonation, foaming and stratification and carry over.

FIGS. 1A, 1B, 1C, 1D and 1E respectively illustrate a perspective view, a top view, a side view, a back view and a bottom view of an exemplary modular beverage dispenser 100, according to various embodiments. As shown in FIGS. 1A-1E, an exemplary beverage dispenser 100 includes a handle 102 and a nozzle module 104 coupled to a front end of the handle 102. A plurality of buttons 106 are provided on a top surface of the handle 102. The plurality of buttons 106 may control properties, a composition or a type of a beverage dispensed by the modular beverage dispenser 100. For example, a first button among the plurality of buttons 106, when depressed or otherwise activated, may result in water being dispensed by the modular beverage dispenser 100. A second button among the plurality of buttons 106, when depressed or otherwise activated, may result in carbonated water or a soda being dispensed by the modular beverage dispenser 100.

Figure 2B:
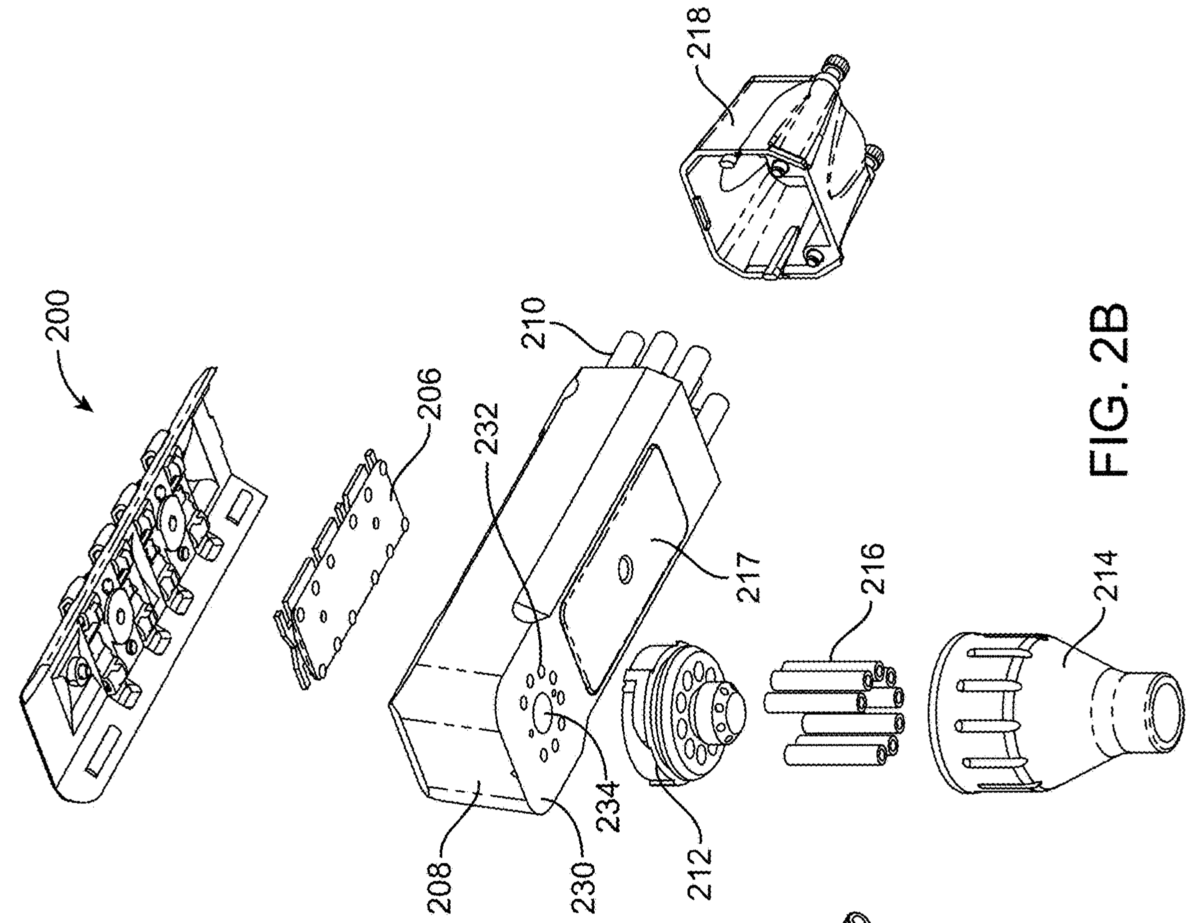
FIGS. 2A and 2B illustrate exploded views of an exemplary modular beverage dispenser viewed from different angles, according to various embodiments.
Figure 2A:
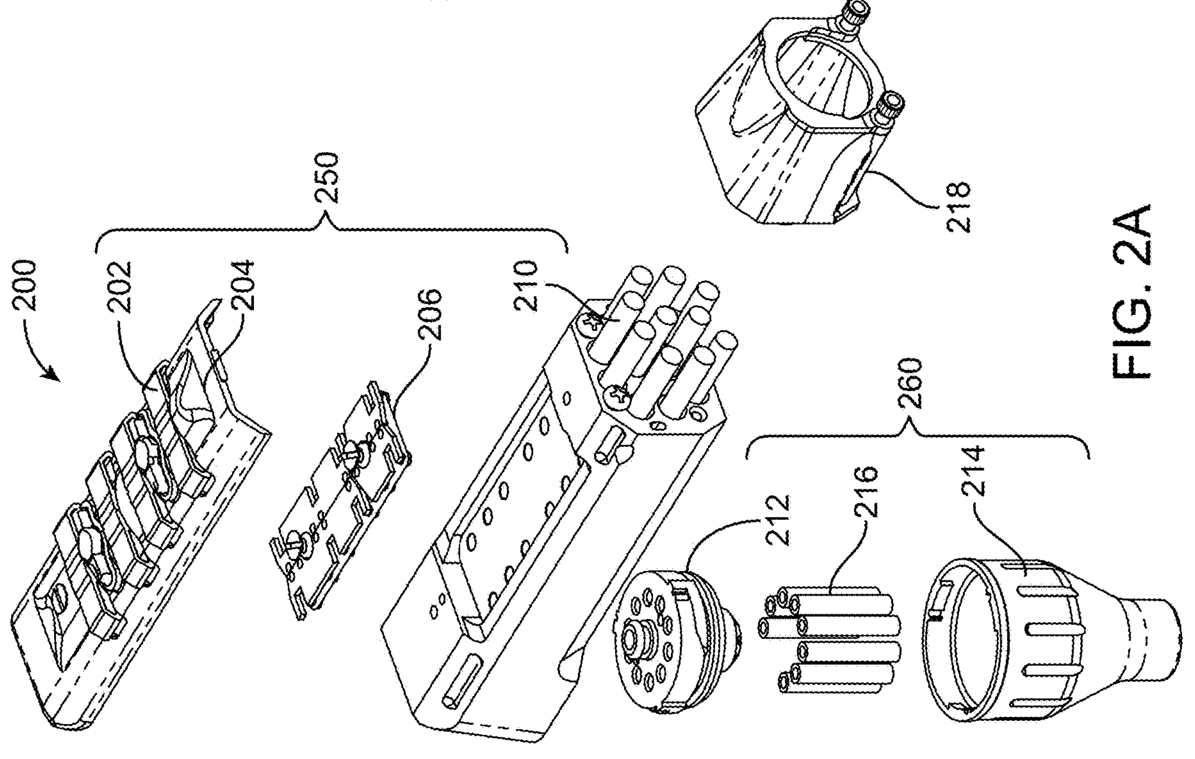

FIGS. 2A and 2B illustrate exploded views of an exemplary modular beverage dispenser 200 viewed from different angles, according to various embodiments. The modular beverage dispenser 200 may include a flow control module 250, a nozzle module 260 and a heel cover 218, removably coupled together. The modular design of the beverage dispenser 200 (e.g., a modular bar gun) allows for ease of maintenance, cleaning, repair and replacement of various components as needed.

The flow control module 250 may include a top plate 204, a plurality of buttons 202 coupled to a top surface of the top plate 204, a butterfly plate 206 placed below the top plate 204, a retainer plate 220 (shown in FIG. 3) that couples the butterfly plate 206 to the top plate 204, and a plurality of tube subassemblies 210.

The handle 208 may include a plurality of flow tracks 702 (shown in FIGS. 7B, 7D, 8A-8E) distributed among four or more levels (e.g., four levels, five levels) layered on top of each other within the handle 208. The flow tracks are described below in greater detail with respect to FIGS. 7B, 7D, 8A-8E. The handle 208 further includes a dispensing surface 230 (shown in FIG. 2B) comprising a handle base fluid outlet 234 and a plurality of handle mixing fluid outlets 232. The handle mixing fluid outlets 232 may be provided around the handle base fluid outlet 234. The handle mixing fluid outlets 232 and the handle base fluid outlet 234 may be referred together as the handle outlets.

The nozzle module 260 may include a diffuser assembly 212, a plurality of diffuser flow inserts 216, and a nozzle 214. The nozzle module 260 is described below in greater details with respect to FIGS. 4A-6C.

FIGS. 3A, 3B, 3C and 3D illustrate exploded views of an exemplary flow control module 250 of a modular beverage dispenser, according to various embodiments. As described above, the flow control module 250 may include the top plate 204, the plurality of buttons 202 coupled to a top surface of the top plate 204, the butterfly plate 206 placed below the top plate 204, the retainer plate 220 that couples the butterfly plate 206 to the top plate 204, and the tube subassemblies 210. According to various embodiments, the flow control module 250 may be modular, and configured to be easily separated from the handle 208.

Figures 3A, 3B, 3C, 3D:
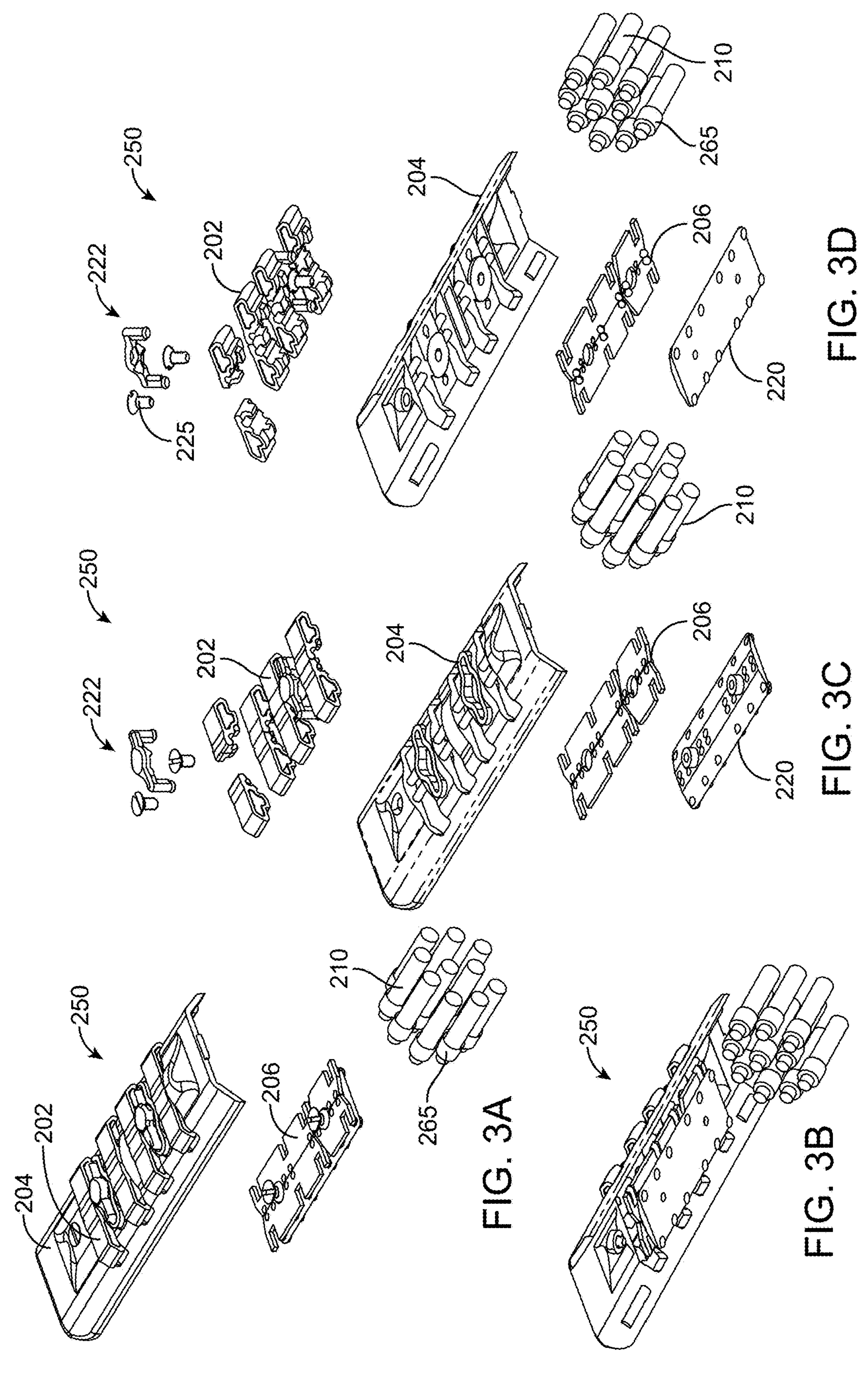
FIGS. 3A, 3B, 3C and 3D illustrate exploded views of an exemplary flow control module of a modular beverage dispenser, according to various embodiments.

The buttons 202 are configured to control flow through one or more of the flow tracks 702 to form a beverage dispensed at the nozzle 214 of the modular beverage dispenser 200. As shown in FIG. 3A, the buttons 202 may have an elongated shape that extends toward the sides of the handle 208 (e.g., the buttons 202 may wrap around the top plate 204). The buttons 202 provide a large surface that can be easily controlled or depressed by the user of the modular beverage dispenser 200. For example, the buttons 202 may be in form of wrapper switch buttons that have an elongated, ergonomic shape for smooth actuation. According to various embodiments, the buttons 202 may be snap-fitted on the top plate 204. Accordingly, the buttons 202 may be easily removed from, or replaced onto the top plate 204. Two or more buttons 202 may be swapped places to identify an updated arrangement of beverage components. In some embodiments, the flow control module 250 may be snap-fitted on the handle 208. In some embodiments, the flow control module 250 may be coupled to the handle 208 via fastening means. For example, the top plate 204 may be attached to the handle 208 via a single screw for ease of removal during cleaning, maintenance, repair or replacement.

The butterfly plate 206, provided below the top plate 204, may selectively actuate one or more valves for the dispensing of one or more beverage components. The selection of the valves corresponds to the activated buttons 202. The butterfly plate 206 may ensure that only the valves that correspond to the depressed buttons 202 are activated. For example, if the user of the modular beverage dispenser 200 selects the first button on the right, the butterfly plate 206 ensures that pressure input is relayed to the corresponding valve and not relayed onto any of the remaining valves. The details of valves and the actuation of the valves via the butterfly plate may be found at a previous patent of the present assignee, U.S. Pat. No. 4,986,449, issued on Jan. 22, 1991 entitled "Beverage Dispensing Apparatus," the disclosure of which is incorporated by reference herein for all purposes.

In some embodiments, the flow control module 250 may include one or more balls coupled underneath the butterfly plate 206 allowing the butterfly plate 206 to pivot based on a pressure applied to one or more of the buttons 202. The buttons 202 may control the flow of beverage fluids and/or components to be received at one or more of the tube subassemblies 210, flow through the handle 208 (e.g., through the flow tracks 702 provided in the handle 208, as discussed in greater detail further below in connection with FIGS. 7B, 7D, 8A-8E), and be dispensed at the nozzle module 260 of the beverage dispenser 200.

The bottom retainer plate 220 keeps the butterfly plate 206 and the top plate 204 together. Fastening means 225 (e.g., a single screw) may couple the bottom retainer plate 220 to the top plate 204 while going through opening on the butterfly plate 206. The butterfly plate 206 remains between the top plate 204 and the retainer plate 220. For example, when the buttons 202 or gaskets 265 (described below) coupled to the tube subassemblies 210 need to be serviced, the retainer plate 220 may be easily removed (e.g., by removing the single screw 225) and the parts can be easily accessed for repair and replacement.

As shown in FIG. 3D, the flow control module 250 may also include a base fluid button 222 that may control the flow of a base fluid, for example, through a larger opening valve. In some embodiments, the base fluid button 222 may have a different shape, color, texture than the remaining buttons 202 for easily differentiating the base fluid from the remaining mixing fluids. For example, the base fluid button 222 may be used to control water flow. According to various embodiments, users may wish to dispense water or other base fluid at a greater flow rate than the mixing fluids (e.g., additives). When depressed, the base fluid button 222 may release the fluid flow (e.g., water flow) through the handle base fluid outlet 234.

The plurality of tube subassemblies 210 may each be connected to a fluid source or a beverage component source (e.g., a base fluid or a mixing fluid). Each tube subassembly is configured to carry a beverage component through the handle to corresponding handle outlet. In some embodiments, the beverage dispensed at a nozzle of the modular beverage dispenser 200 may be formed by mixing two or more beverage components (e.g., a base fluid and one or more mixing fluids) transported through two or more of the tube subassemblies 210. The plurality of flow tracks 702 may extend between an end of the plurality of tube subassemblies 210 and the handle outlets (including the handle base fluid outlet 234 and the handle mixing fluid outlets 232). Each one of the tube subassemblies 210 may be connected to a corresponding flow track 702 via a mechanical gasket (e.g., an O-ring) 265 to prevent leakage and provide improved fit between the inlet of the flow track 702 and the outlet (e.g., opening) of the tube subassembly 210.

The heel cover 218 may be a split heel cover having a top plate and a bottom plate that encapsulate at least a portion of the plurality of tube subassemblies 210. The heel cover 218 may be coupled to a rear end of the handle 208. According to various embodiments, the heel cover 218 may include a top cover 432, a base cover 430 and fastening means 434 that couple the top cover 432 and the base cover 430 to keep the tube subassemblies 210 in place, retained between the top cover 432 and the base cover 430. In some embodiments, the base cover 430 may be formed as a single unit (e.g., monolithic) with the handle 208.

Figure 4B:
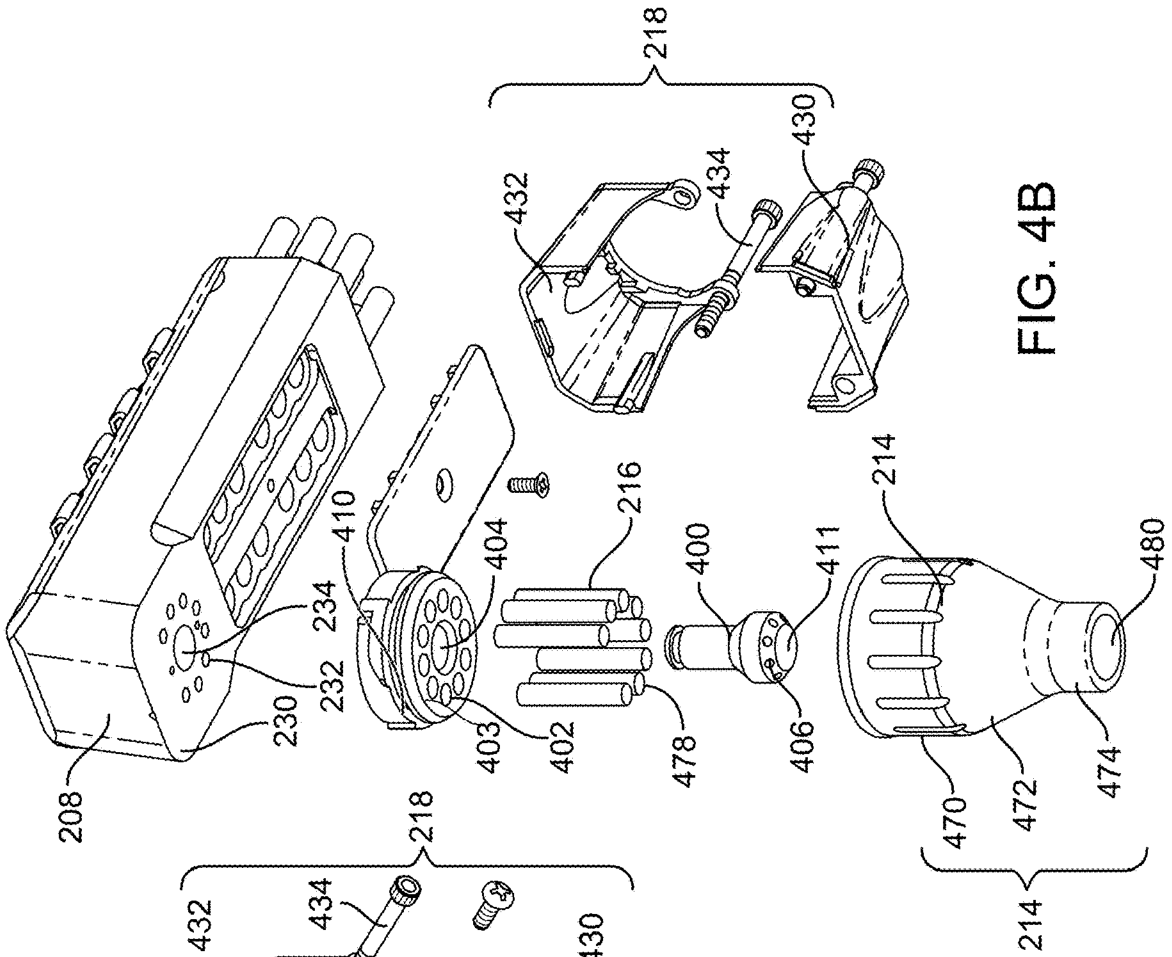
FIGS. 4A and 4B illustrate exploded views of a nozzle module along with other components of an exemplary modular beverage dispenser, according to various embodiments.
Figure 4A:
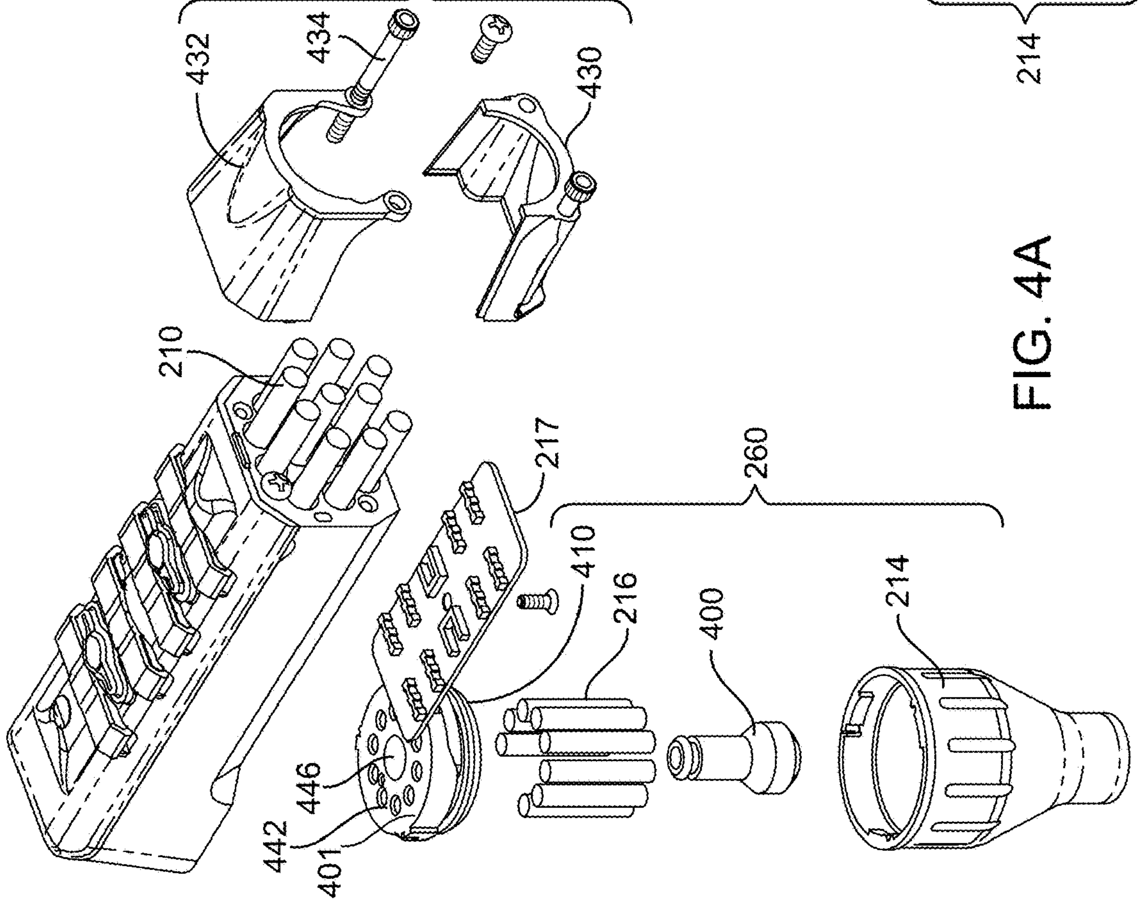

FIGS. 4A and 4B illustrate exploded views of a nozzle module 260 along with other components of an exemplary modular beverage dispenser, according to various embodiments.

As explained above, the nozzle module 260 may include a nozzle 214 that fits around/over a diffuser assembly 212. As shown in FIG. 4A, the diffuser assembly 212 may be a two-piece diffuser assembly including (1) a diffuser base 410 that may permanently attach to the handle 208 (e.g., to the dispensing surface 230 of the handle 208), and (2) a water diffuser 400. In some embodiments, the water diffuser 400 may be removable from the diffuser assembly 212. Alternatively, the water diffuser 400 may be permanently attached to the diffuser base 410 and/or the handle 208. In either configuration, the water diffuser 400 may be seated into an opening (e.g., handle base fluid outlet 234) of the handle 208 and may be held in place with a gasket (e.g., an o-ring). The water diffuser 400 is described below in greater detail in connection with FIG. 5.

The nozzle 214 may be configured to couple to the diffuser base 410. For example, the nozzle 214 may be a twist-on or slip-on nozzle. The nozzle 214 may include larger diameter portion 470 and a smaller diameter portion 474 connected to each other via a tapered portion 472. The larger diameter portion 470 may couple to the diffuser base 410. An interior of the nozzle 214 may be a hallow cavity configured to receive the diffuser assembly 212 therein. A nozzle outlet 480 is provided as an opening at an end of the smaller diameter portion 474. The beverage dispensed from the modular beverage dispenser 100, 200 is dispensed at the nozzle outlet 480.

The beverage may be dispensed at the nozzle outlet 480 at a predetermined flow rate. As the flow rate increases beyond 2 ounces per second (e.g., 2.5 oz/sec.), the agitation inside the nozzle 214 is such that an excessive amount of foam is generated in conventional beverage dispensers. This is an undesirable effect for the beverage dispensers, and should be reduced or preferably eliminated. The water diffuser 400 described herein is sized and shaped to reduce the foaming when the flow rate is above 2 ounces per second. In some embodiments, this is achieved using the angled outlets on the water diffuser 400. According to various embodiments, the nozzle module 260 (including the nozzle 214 and the diffuser assembly 212) is configured to meet a set of predetermined improved requirements for foaming, mixing and drip criteria.

The diffuser base 410 may include a central inlet 446 and a plurality of diffuser inlets 442 provided around the central inlet 446 on a top surface 401 of the diffuser base 410 facing the dispensing surface 230 of the handle 208. The central inlet 446 may align with the handle base fluid outlet 234 and the plurality of diffuser inlets 442 may align with the plurality of handle mixing fluid outlets 232. The diffuser base 410 may include a central outlet 404 and a plurality of diffuser outlets 402 provided around the central outlet 404 on a bottom surface 403 of the diffuser base 410 opposite from the top surface 401. A central opening may extend between the central inlet 446 and the central outlet 404. At least a portion of the water diffuser 400 (e.g., an elongated neck portion, as described below in connection with FIG. 5) may be provided in the central opening of the diffuser base 410. The base fluid dispensed at the handle base fluid outlet 234 may flow through an inlet 424 of the water diffuser 400 to be dispensed at outlets 406 (including secondary outlets 408, when provided) of the water diffuser 400. The mixing fluid dispensed at the handle mixing fluid outlets 232 may be dispensed at one or more of the diffuser outlets 402 of the diffuser base 410. According to various embodiments, one or more of the diffuser outlets 402 may have different size(s), dimension(s) and/or opening diameter(s) to accommodate the different mixing ratios for different flavor profiles of the beverages dispensed using the beverage dispenser described herein.

A diffuser channel 450 (shown in FIG. 6C) may extend between each diffuser inlet 442 and each diffuser outlet 402. The plurality of diffuser channels 450 may be arranged around the central inlet 446 of the diffuser base 410. A diffuser flow insert 216 may be provided in each diffuser channel 450. The diffuser flow inserts 216 may be retained within the diffuser channels 450 due to friction fit. The diffuser flow insert 216 reduces the flow rate of the mixing fluid flowing through the each diffuser outlet 402. According to various embodiments, the beverage dispenser 100, 200 does not throttle the base fluid (e.g., water). The diffuser flow insert 216 balance the flow rate (and therefore the ratio) of the mixing fluid (e.g., additive, syrup) to the base fluid (e.g., water) for the various recipes (e.g., 5 to 1 ratio for sugared beverages, 5 to 1 ratio for diet beverages, high-yield 8.5 to 1 ratio for a diet product).

According to various embodiments, each diffuser flow insert 216 may include a nozzle or an orifice therein. An opening of the nozzle or the orifice is smaller than an inner diameter of the diffuser flow insert 216. The nozzle of the orifice of the diffuser flow insert 216 is located at a portion of the diffuser flow insert 216 that remains within the diffuser channel 450.

Figure 7A:
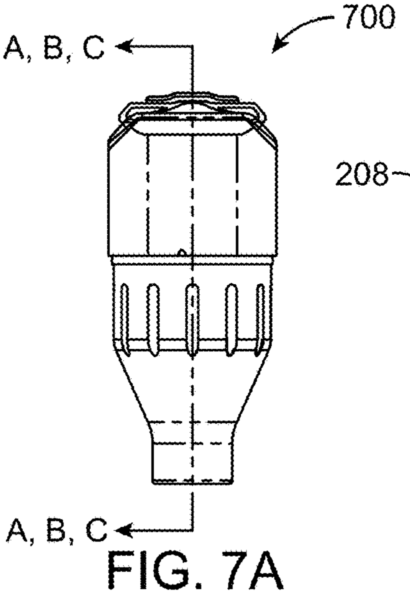
FIG. 7A illustrates a front view of a modular beverage dispenser, according to various embodiments.
Figure 7B:
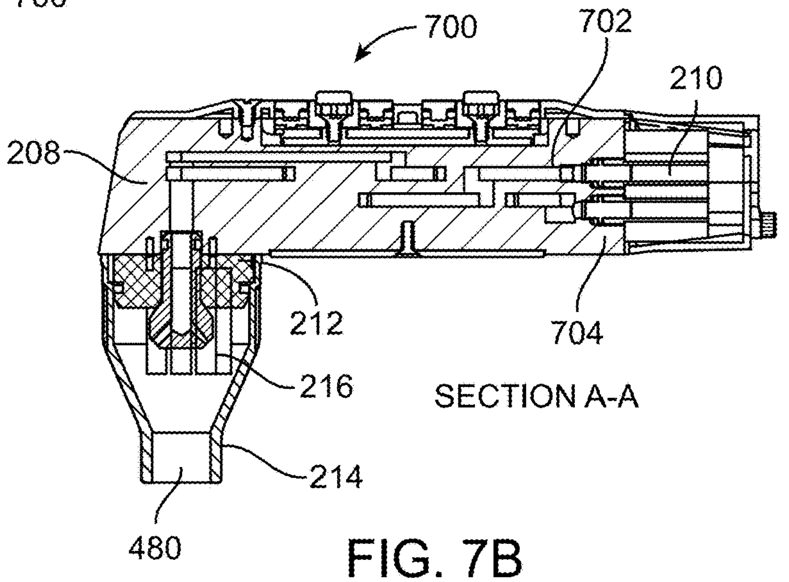
FIGS. 7B, 7C and 7D illustrate various cross-sectional views of an exemplary modular beverage dispenser illustrated in FIG. 7A.

In some embodiments, the diffuser flow inserts 216 may be elongated such that they are longer than the diffuser channels 450 and extend beyond the diffuser outlets 402 of the diffuser base 410, as shown in FIG. 7B. That is, the diffuser flow inserts 216 extend past a bottom surface 411 of the water diffuser 400 such that an output of the diffuser flow inserts 216 is downstream from an output of the water diffuser 400. In those embodiments, one or more mixing fluids may flow through the diffuser inlets 442 and the diffuser flow inserts 216 of the diffuser base 410 to be dispensed at an outlet 478 of the diffuser flow inserts 216 below the output of the water diffuser 400 to be mixed with the base fluid dispensed at outlets of the water diffuser 400 within the nozzle. The mixed beverage is then dispensed at the nozzle outlet 480. In these embodiments, the water stream starts upstream of the mixing fluids, and the mixing fluids are injected into the water stream dispensed from the outlets 406 of the water diffuser 400.

Figure 6A:
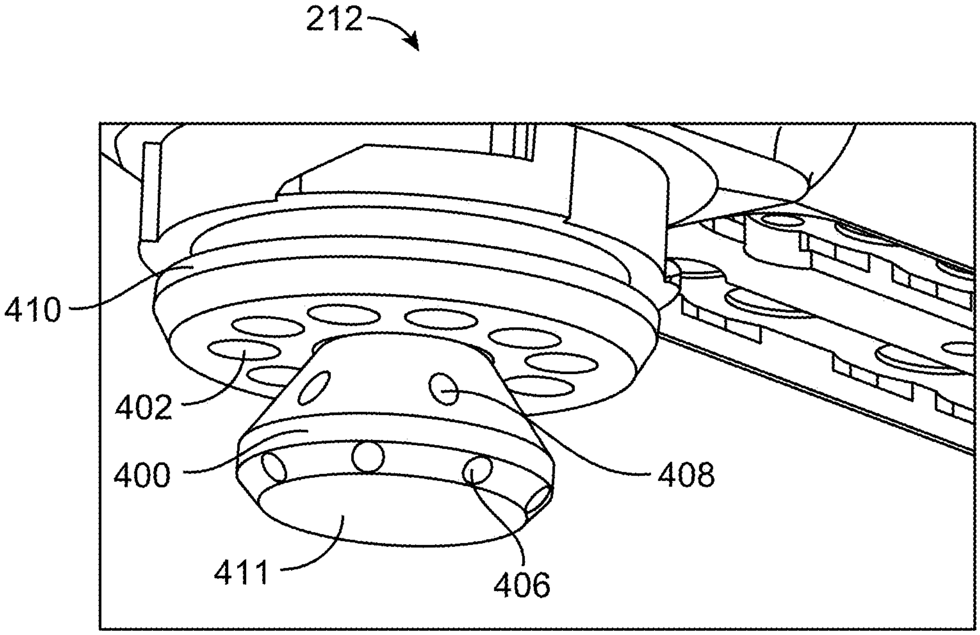
FIGS. 6A, 6B, and 6C illustrate the water diffuser with an additional set of angled outlets, according to various embodiments.
Figure 6B:
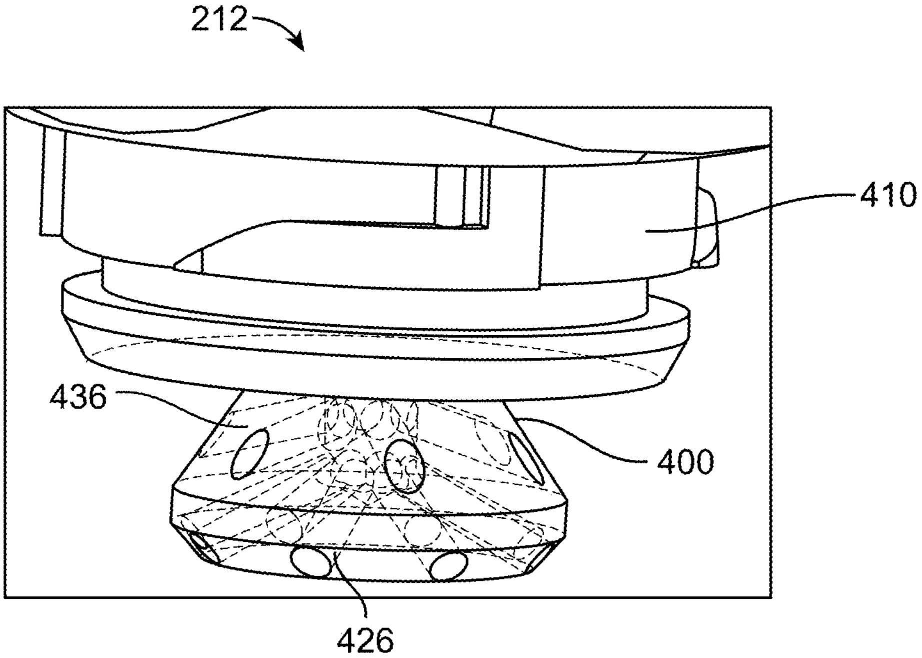
Figure 6C:
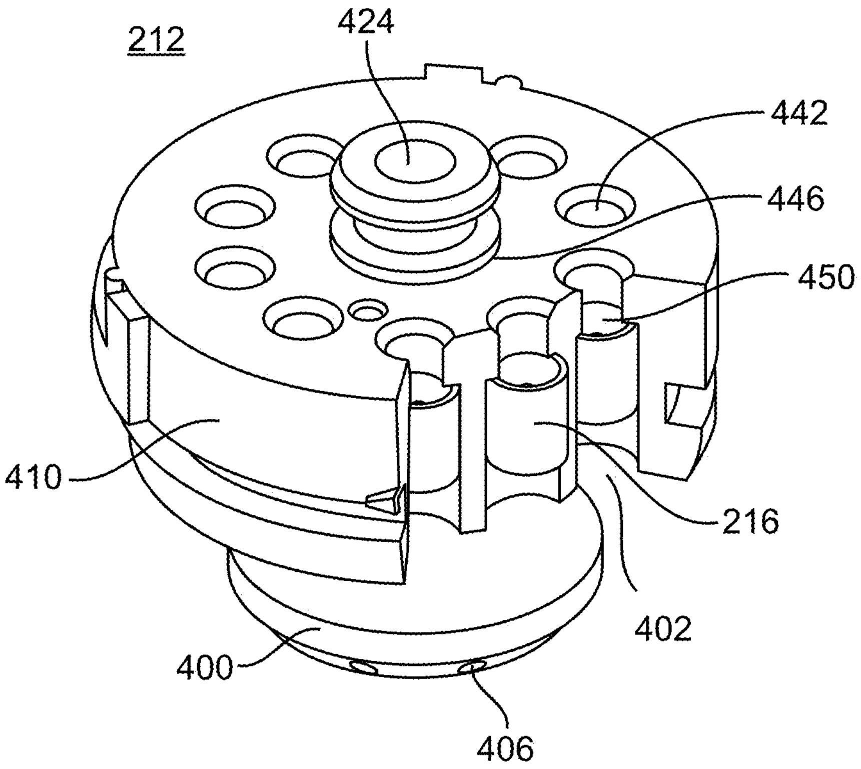

In some embodiments, the diffuser flow inserts 216 may be elongated such that they are shorter than the diffuser channels 450 and do not extend beyond the diffuser outlets 402 of the diffuser base 410, as shown in FIG. 6C. That is, an output of the diffuser flow inserts 216 is upstream from an output of the water diffuser 400. In those embodiments, one or more mixing fluids may flow through the diffuser inlets 442 and the diffuser flow inserts 216 of the diffuser base 410 to be dispensed at the diffuser outlets 402 of the diffuser base 410 above the output of the water diffuser 400 to be mixed with the base fluid dispensed at outlets of the water diffuser 400 within the nozzle. The mixed beverage is then dispensed at the nozzle outlet 480.

Figure 5:
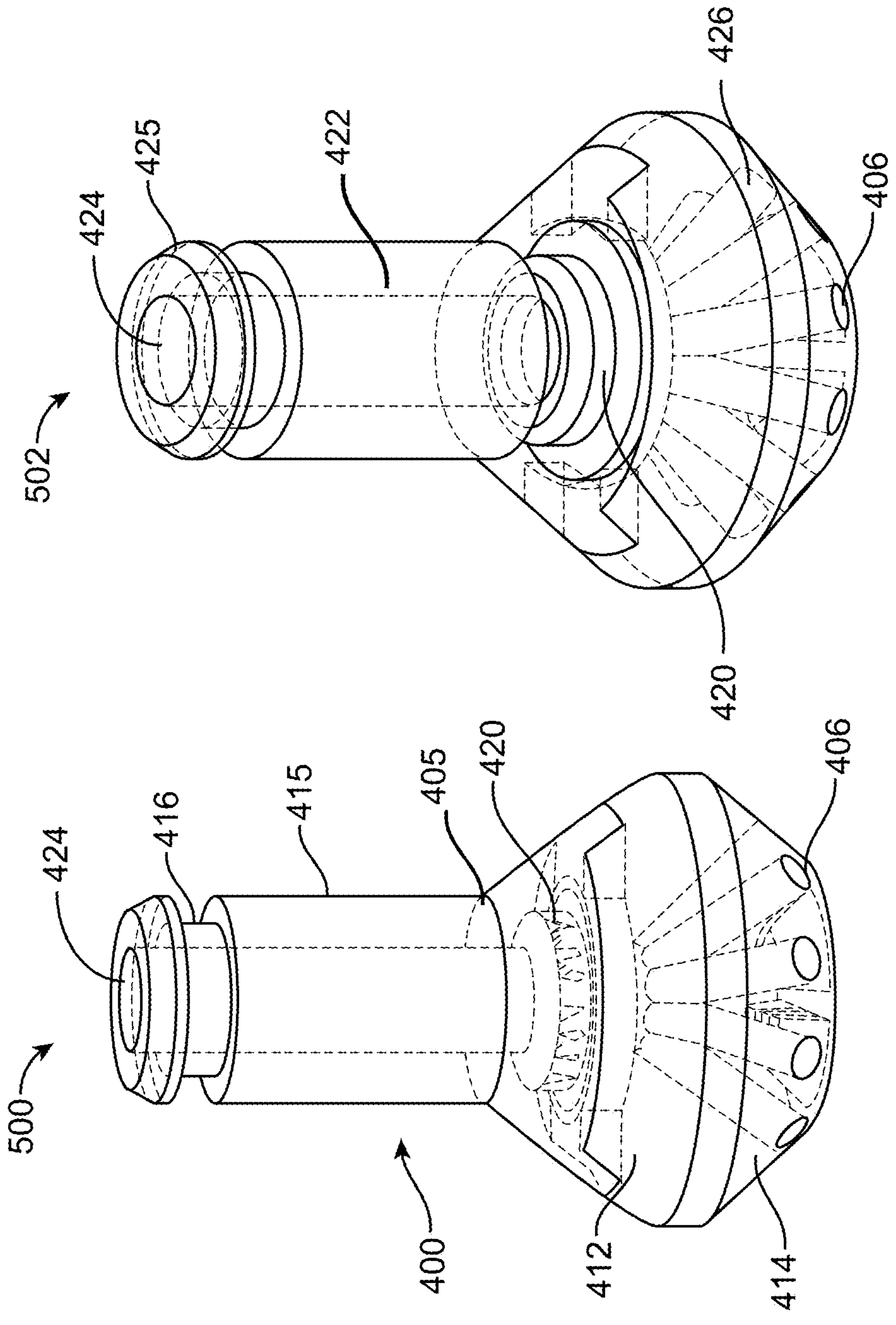
FIG. 5 illustrates a perspective view and a transparent section view of an exemplary water diffuser, according to various embodiments.

FIG. 5 illustrates a perspective view 500 and a transparent section view 502 of an exemplary water diffuser 400, according to various embodiments. The water diffuser 400 may include an elongated neck 415 configured to fit into a central opening of the diffuser base 410. A first tapered surface 412 may be provided at a first end 405 of the elongated neck 415. A second tapered surface 414 may be provided below the first tapered surface 412. In some embodiments, a flat surface may connect the first tapered surface 412 and the second tapered surface 414. A tapering angle of the first tapered surface 412 may be opposite to a tapering angle of the second tapered surface 414. A set of angled outlets 406 configured dispense water may be provided along the second tapered surface 414. The set of angled outlets 406 may be placed at a predetermined angle to reduce foaming that would result from the high flow rate (e.g. above 2.5 oz./sec) of the water flowing through the water diffuser 400. A number of the set of angled outlets 406 may also be determined based on the foaming (e.g., more angled outlets 406 may further reduce undesirable foaming).

The water diffuser 400 may include a recess 416 provided below a second end 425 of the elongated neck 415. When the water diffuser 400 is coupled to the diffuser base 410 to form the diffuser assembly 212, the elongated neck 415 extends through the central inlet 446 of the diffuser base 410 such that the recess 416 remains above the top surface 401 of the diffuser base 410. When the diffuser assembly 212 is coupled to the handle 208, the recess 416 goes through the handle base fluid outlet 234 such that an inlet 424 of the water diffuser 400 is in fluid connection with the handle base fluid outlet 234. The recess 416 is received within the handle base fluid outlet 234 to remain in a chamber 235 (shown in FIG. 7C) above the handle base fluid outlet 234.

The water received at the inlet 424 of the water diffuser 400 flows through an inner channel 422 extending along the elongated neck 415. The inner channel 422 extends between the inlet 424 and the set of angled outlets 406. A plurality of channels 426 extend at an angle between the inner channel 422 and the set of angled outlets 406. The plurality of channels 426 transport water from the inner channel 422 to the set of angled outlets 406. The base fluid (e.g., water) dispensed at the handle base fluid outlet 234 is received at the inlet 424, flows through the inner channel 422, flows through the plurality of channels 426 to be dispensed at the set of angled outlets 406.

An anti-drip gasket 420 (e.g., a flap check valve) may be provided at the first end 405 of the elongated neck 415. The anti-drip gasket 420 is provided above an end of the inner channel 422 opposite from the inlet 424 connecting the handle base fluid outlet 234 to the inner channel 422. The plurality of channels 426 are provided downstream from the anti-drip gasket 420. The anti-drip gasket 420 is configured to prevent dripping from the water diffuser 400. For example, the water diffuser 400 including the anti-drip gasket 420 has less than 0.5 gram per 30 sec dripping (e.g. one drip is about 0.1 gr) at normal system operating conditions. That is, the beverage dispenser described herein has less than or equal to 5 drops as post pour drips. The remaining of the drops are kept in the handle 208. In some embodiments, one or more cuts may be made on the anti-drip gasket 420. For example, cuts on the anti-drip gasket 420 may transform the anti-drip gasket to a 4-flap gasket.

In some embodiments, a spring-loaded ball check valve may be coupled to the water diffuser 400 as an anti-drip device. When the spring-loaded ball check valve is closed, the pressure is off, the spring-loaded ball check valve snaps and captures all liquid above it. The flow track after the spring-loaded ball check valve may be streamlined such that when the spring-loaded ball check valve is closed, all liquid comes out, and no liquid is left in the beverage dispenser 200.

In some embodiments, the dripping is prevented using a water isolation technique where carbonated water runs within the top flow tracks down the center of the water diffuser 400, and still water runs around the center post in a series of ports that may drop in diameter through the handle 208 and the diffuser assembly 212. Most or all stagnant zones are removed in the water isolation technique such that no water is left in the modular handle 208 when the button 202 is released.

In some embodiments as shown in FIGS. 6A and 6B, the water diffuser 400 may also include an additional set of angled outlets 408 configured dispense water provided along the first tapered surface 412 upstream from the set of angled outlets 406. The water received at the inlet 424 of the water diffuser 400 flows through an inner channel 422 extending along the elongated neck 415. The inner channel 422 extends between the inlet 424 and the set of angled outlets 406 and the additional angled outlets 408. A plurality of channels 426 extend at an angle between the inner channel 422 and the set of angled outlets 406. Additional channels 436 are provided extending at an angle between the inner channel 422 and the additional set of angled outlets 408 (as shown in FIG. 6B). The plurality of channels 426 and the additional channels 436 transport water from the inner channel 422 to the set of angled outlets 406 and the additional set of angled outlets 408, respectively. The base fluid (e.g., water) dispensed at the handle base fluid outlet 234 is received at the inlet 424, flows through the inner channel 422, flows through the plurality of channels 426 to be dispensed at the set of angled outlets 406, and flows through the additional channels 436 to be dispensed at the additional angled outlets 408, upstream from the set of angled outlets 406. For example, the upper stream from the additional angled outlets 408 rinse the upper portion 470 or 472 of the nozzle 214, and the lower stream from the set of angled outlets 406 agitate the mixing fluid (coming from the diffuser outlets 402 of the diffuser base 410) and send the beverage out of nozzle 214.

Figure 7C:
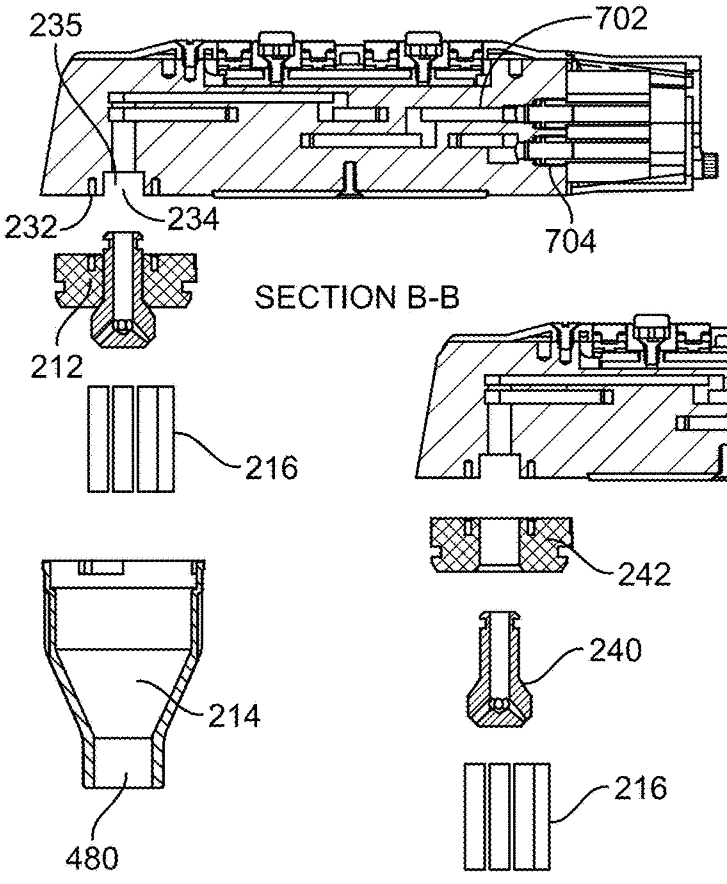
Figure 7D:
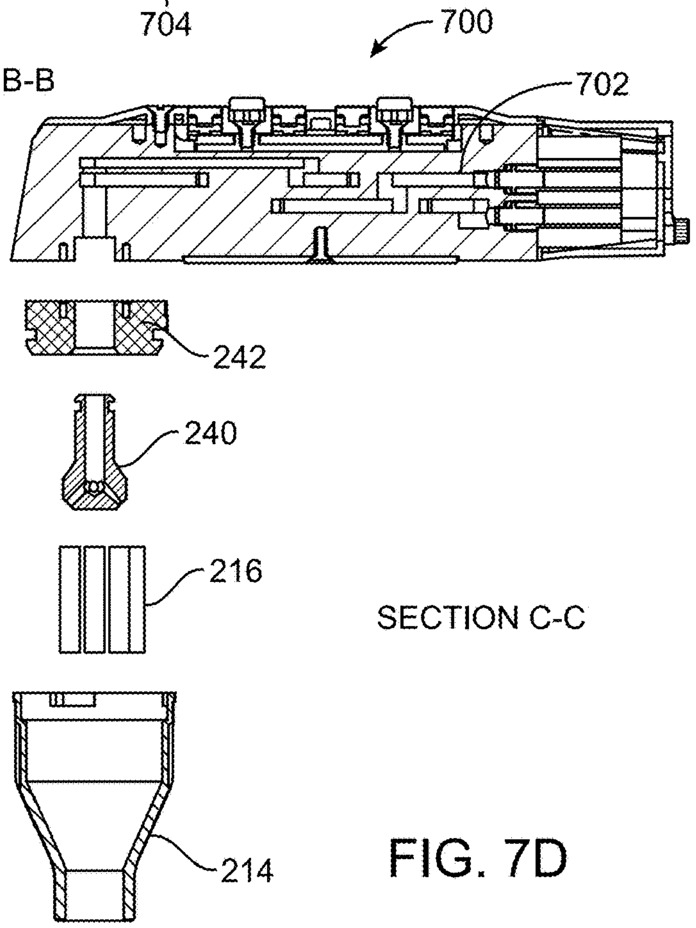

FIGS. 7B-7C illustrate various cross-sectional views of an exemplary modular beverage dispenser 700 illustrated in FIG. 7A. FIGS. 7B-7D illustrate the multi-level flow tracks 702 provided within the handle 208 of the beverage dispenser 700. According to some embodiments, the handle 208 may include channels (e.g., flow tracks) 702 arranged along horizontal levels. Each horizontal level may extend along a plane that is parallel to the planes along with the remaining levels extend. According to various embodiments, the flow tracks may be distributed among four or more levels layered on top of each other within the handle 208. In some embodiments, a flow track may include a first portion extending along a first layer and a second portion extending along a second layer parallel to the first layer. That is, the flow track may include a step where the fluid flowing in the flow track flows along the first layer within a first portion of the handle, and flows along the second layer within a second portion of the handle.

Each flow track 702 may form a flow channel including an inlet port 704 coupled to a tube subassembly 210 via a mechanical gasket (e.g., an O-ring) 265 provided around the tube subassembly 210. The mechanical gasket prevents leakage and provides improved fit between the inlet port 704 of the flow track 702 and the outlet (e.g., opening) of the tube subassembly 210. Fluid flowing in the tube subassemblies 210 flow through the flow tracks 702 toward the dispensing surface 230 of the handle 208. In some embodiments, one or more of the flow tracks 702 may be provided with visual cues (e.g., color coding, labeling) that represents the fluid flowing therein.

The flow tracks 702 on various levels may connect to the handle base fluid outlet 234 and the handle mixing fluid outlets 232 of the handle 208. As explained above, the handle base fluid outlet 234 of the handle 208 is in fluid communication with the central outlet 404 of the diffuser base 410 that receives the water diffuser 400. Accordingly, the base fluid (e.g., water) flowing in the handle base fluid outlet 234 of the handle 208 flows through the central outlet 404 of the diffuser base 410 and is dispensed at the angled outlets 406 of the water diffuser 400. The mixing fluid (e.g., additive, syrup) flowing through one or more of the handle mixing fluid outlets 232 of the handle 208 flows through the diffuser outlets 402 of the diffuser base 410. The base fluid and one or more mixing fluids are mixed within the nozzle 214 and dispensed at the nozzle outlet 480 of the beverage dispenser. According to various embodiments, the beverage may be dispensed at a flow rate of at least 2.5 ounces per second at the nozzle outlet 480.

Figure 8A:
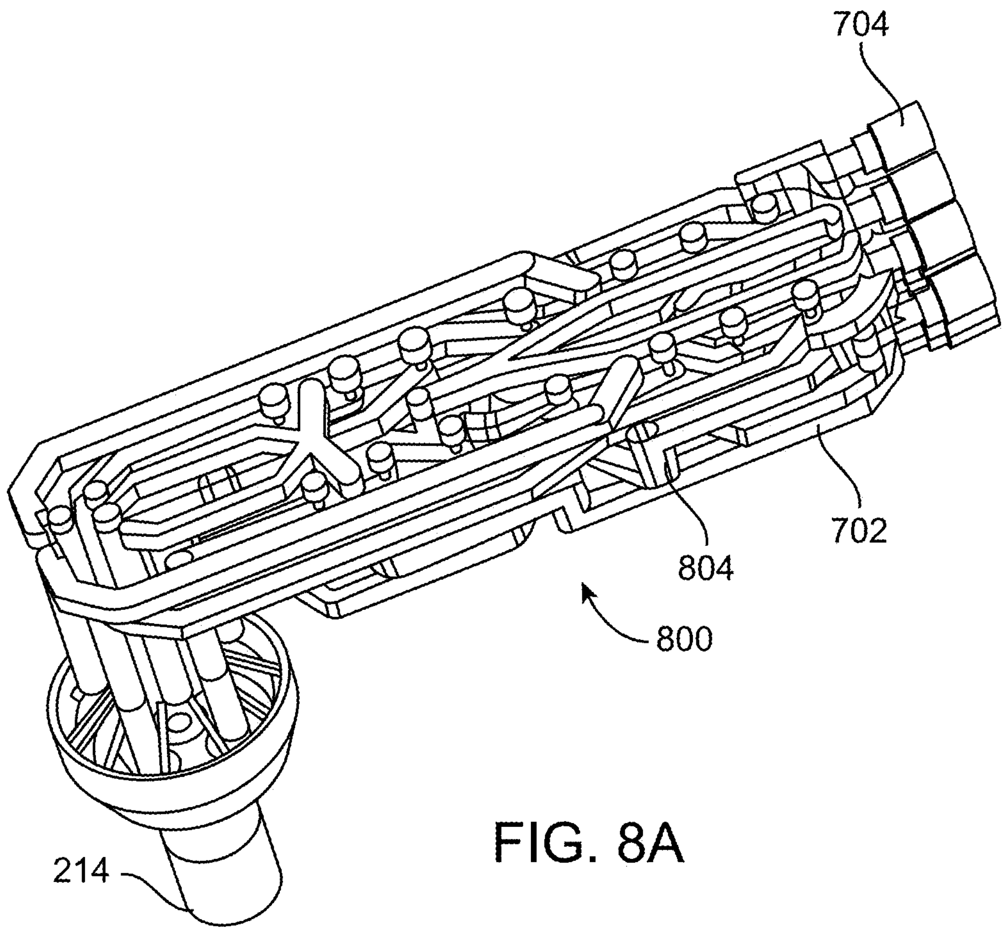
FIGS. 8A, 8B, 8C, 8D and 8E illustrate various configurations for multi-level flow tracks of the handle of an exemplary beverage dispenser, according to various embodiments.
Figure 8B:
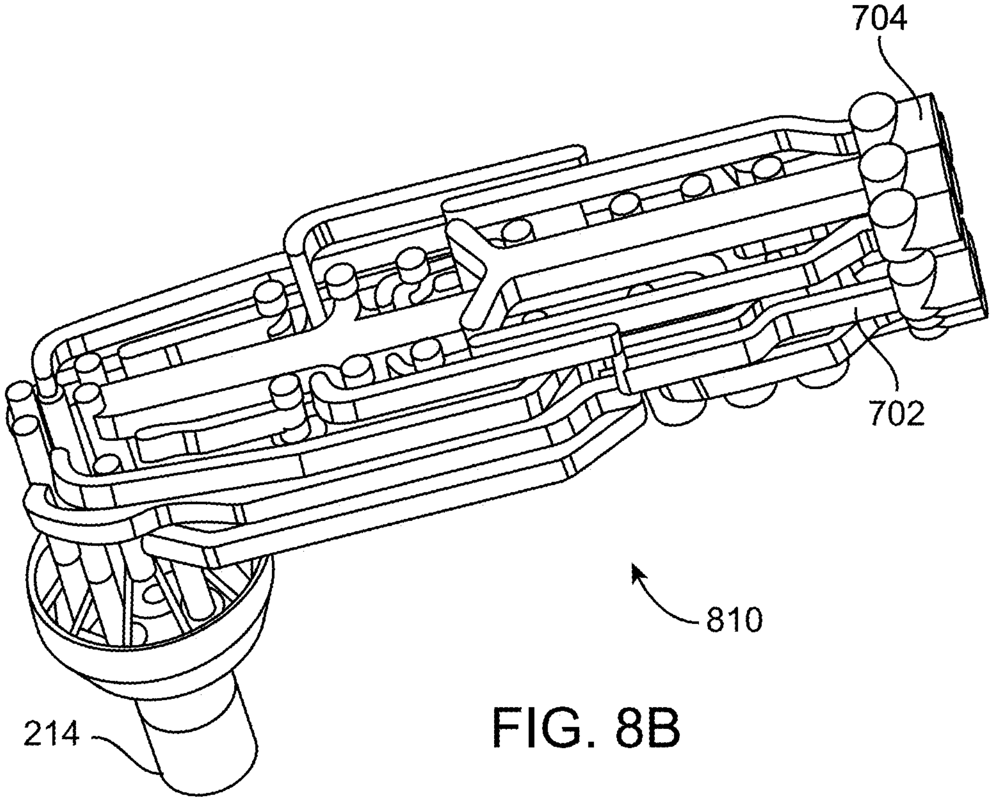
Figure 8C:
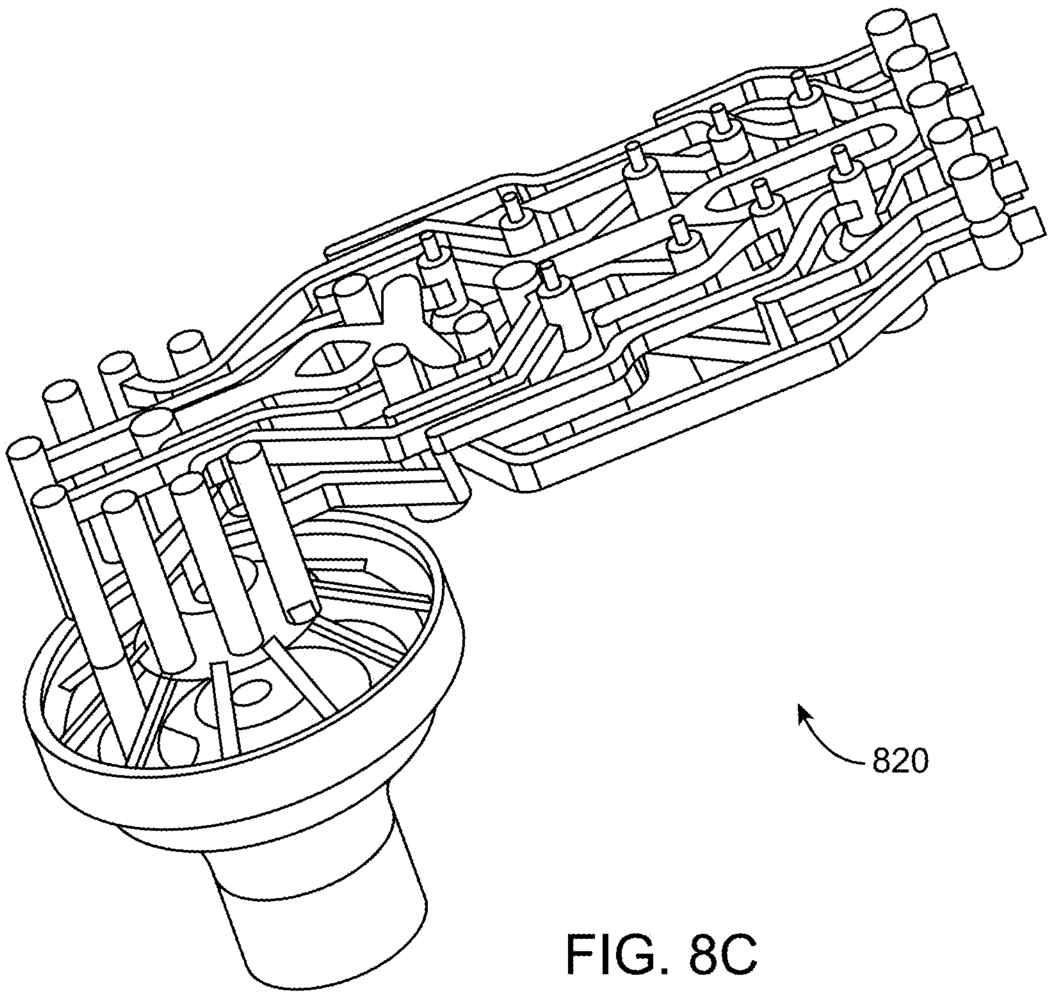
Figure 8D:
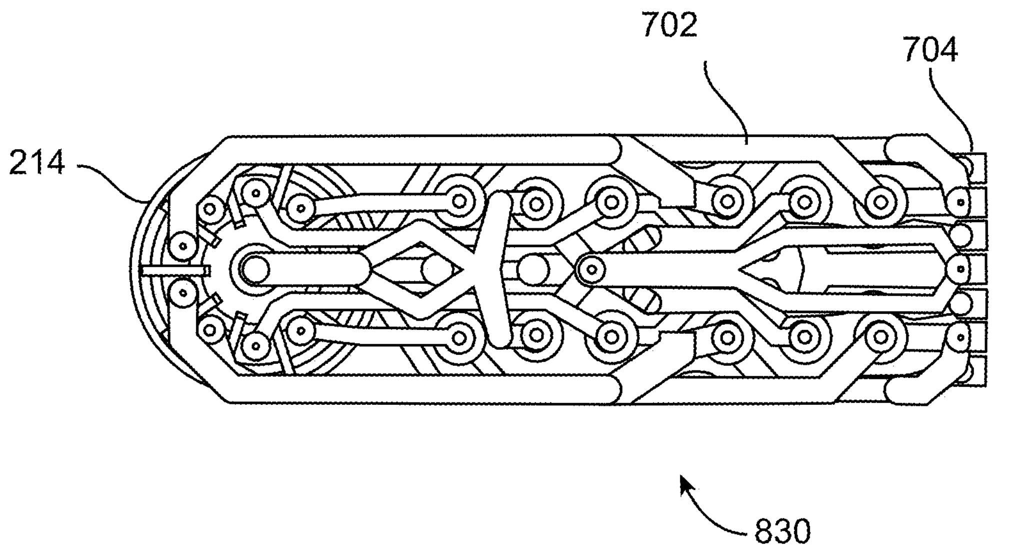
Figure 8E:
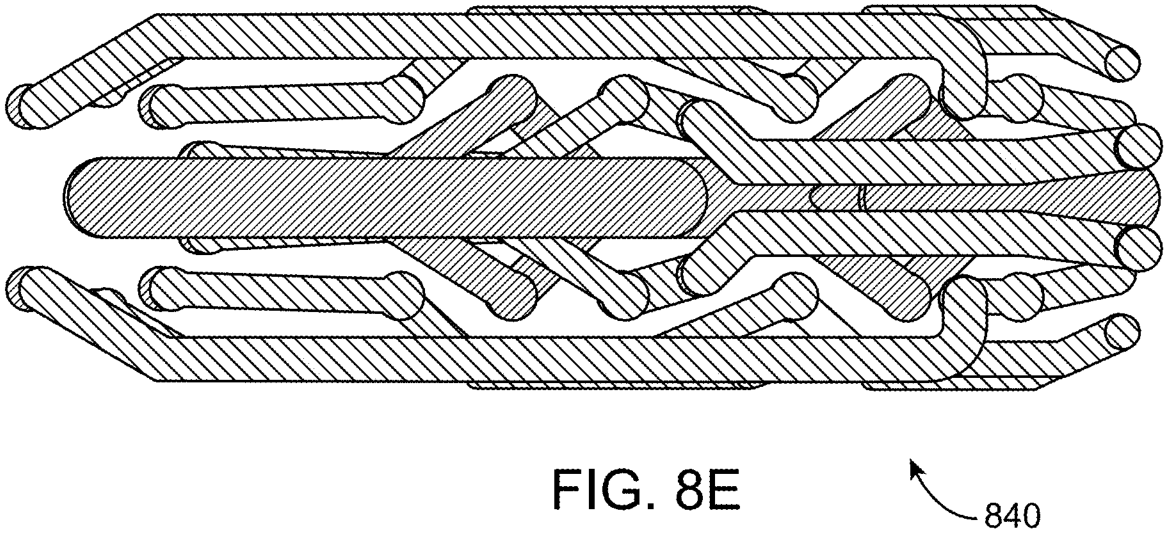

FIGS. 8A-8E illustrate various configurations for multi-level flow tracks (e.g., four or more) of the handle of an exemplary beverage dispenser, according to various embodiments. The first configuration 800 illustrated in FIG. 8A includes flow tracks 702 distributed among a plurality of levels. The second configuration 810 illustrated in FIG. 8B includes flow tracks 702 distributed among a plurality of levels. The third configuration 820 illustrated in FIG. 8C includes flow tracks 702 distributed among 3 levels. FIGS. 8D and 8E illustrate a top view of different track configurations 830, 840, respectively.

In some embodiments, a configuration with a lower number of levels provides a reduced number of level changes for the flowing fluid, which may improve the flow rate of the flowing fluid. According to various embodiments, the flow tracks 702 may include fillets (e.g., rounded interior corners) instead of sharp corners, and an increased track cross section area compared to conventional beverage dispenser flow tracks.

As shown in FIGS. 8A-8C, a flow track 702 may include a vertical portion 804 that allows the flow track 702 to lie along two separate levels. Using a vertical portion 804, the fluid flowing within a flow track 702, may flow down or up between two levels. That is, while levels extend parallel to each other, the flow tracks 702 may cross levels.

According to some embodiments, the top level and the bottom level of a track configuration may consist of the flow tracks for the base fluid (e.g., water, carbonated water, soda). The middle levels (e.g., the middle one or two levels) may consist of the flow tracks for the mixing fluid (e.g., additive, syrup). In some embodiments, one of the middle levels may be eliminated and the cross section area of the flow tracks at the upper level and the lower level may be increased for the base fluid. For example, in the first configuration 800 with four levels, the handle body may have a smaller profiled compared to the second configuration 810 with five levels. In some embodiments, the first configuration 800 may have a smaller number of flow tracks than the second configuration 810.

FIGS. 9A-12B illustrate pressure trajectories of fluids flowing through the flow tracks of the handle of an exemplary beverage dispenser using computational fluid dynamics (CFD), according to various embodiments.

Figure 9A:
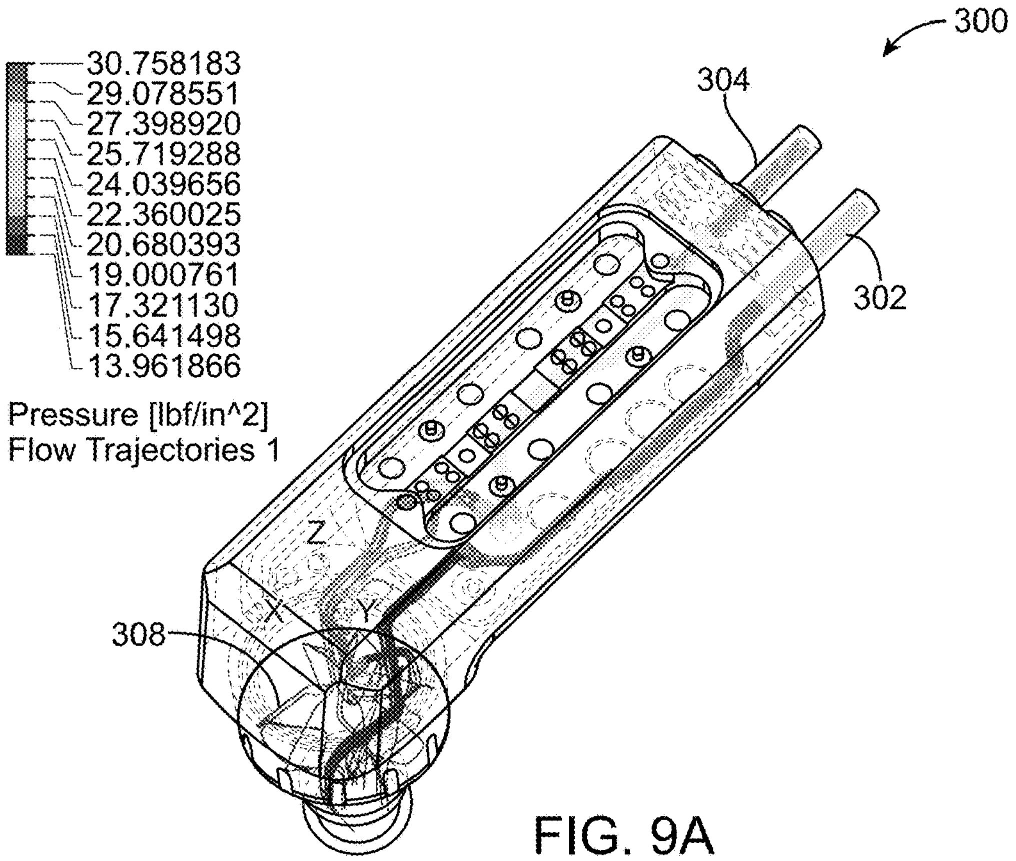
FIGS. 9A-9B illustrate a first pressure trajectory inside a handle of an exemplary beverage dispenser including 5-level flow tracks for a mixing fluid and a first type of base fluid, according to various embodiments.
Figure 9B:
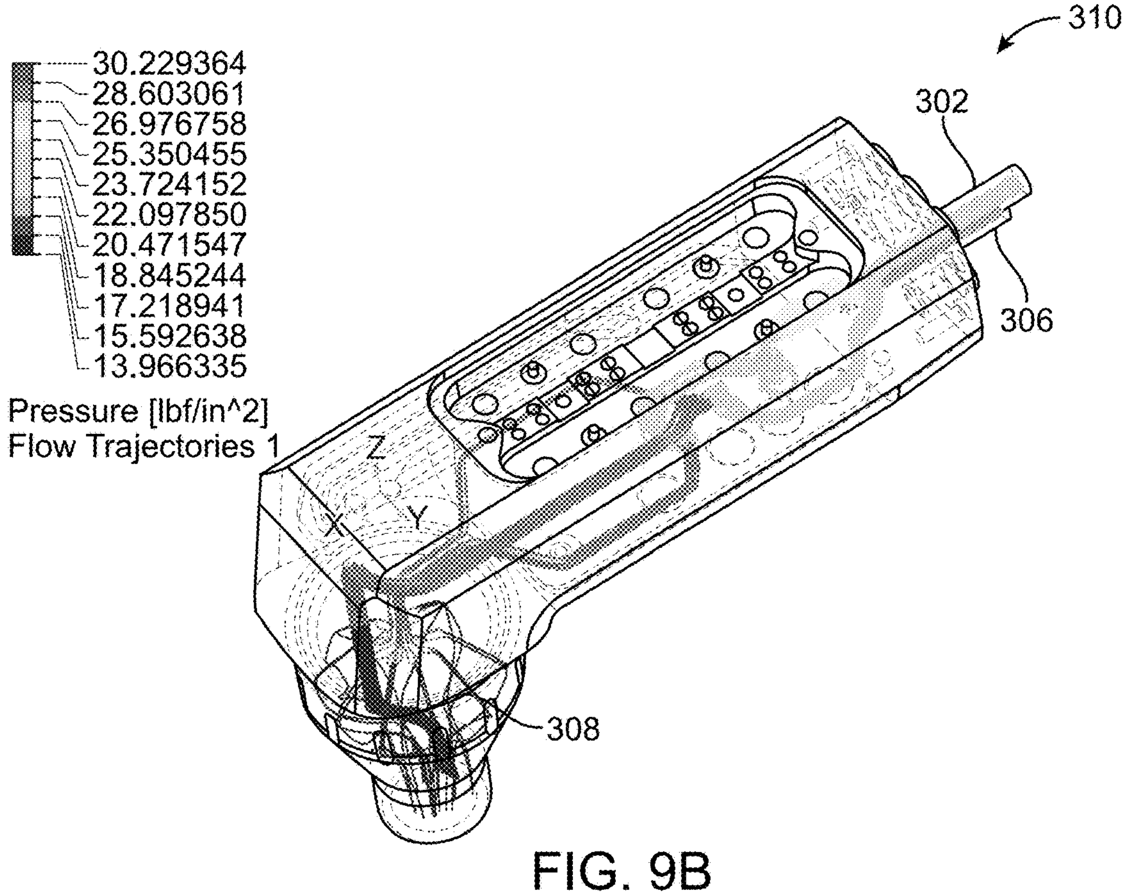

FIG. 9A illustrates a first pressure trajectory 300 inside a handle of an exemplary beverage dispenser including 5-level flow tracks for a mixing fluid (e.g., syrup) 302 and a first type of base fluid (e.g., soda) 304, according to various embodiments. FIG. 9B illustrates a second pressure trajectory 310 inside a handle of an exemplary beverage dispenser including 5-level flow tracks for a mixing fluid (e.g., syrup) 302 and a second type of base fluid (e.g., water) 304, according to various embodiments. While the base fluid is provided to the flow track inlet port 704 at a higher pressure than the mixing fluid, the pressure of both fluids decrease along the flow tracks while the fluids flow from the inlet ports 704 of the flow tracks 702 toward the dispensing surface 230 of the handle 208. Once the base fluid is dispensed at the angled outlets 406 of the water diffuser 400, the trajectory of the base fluid 304, 306 is branches into multiple trajectories 308.

Figure 10A:
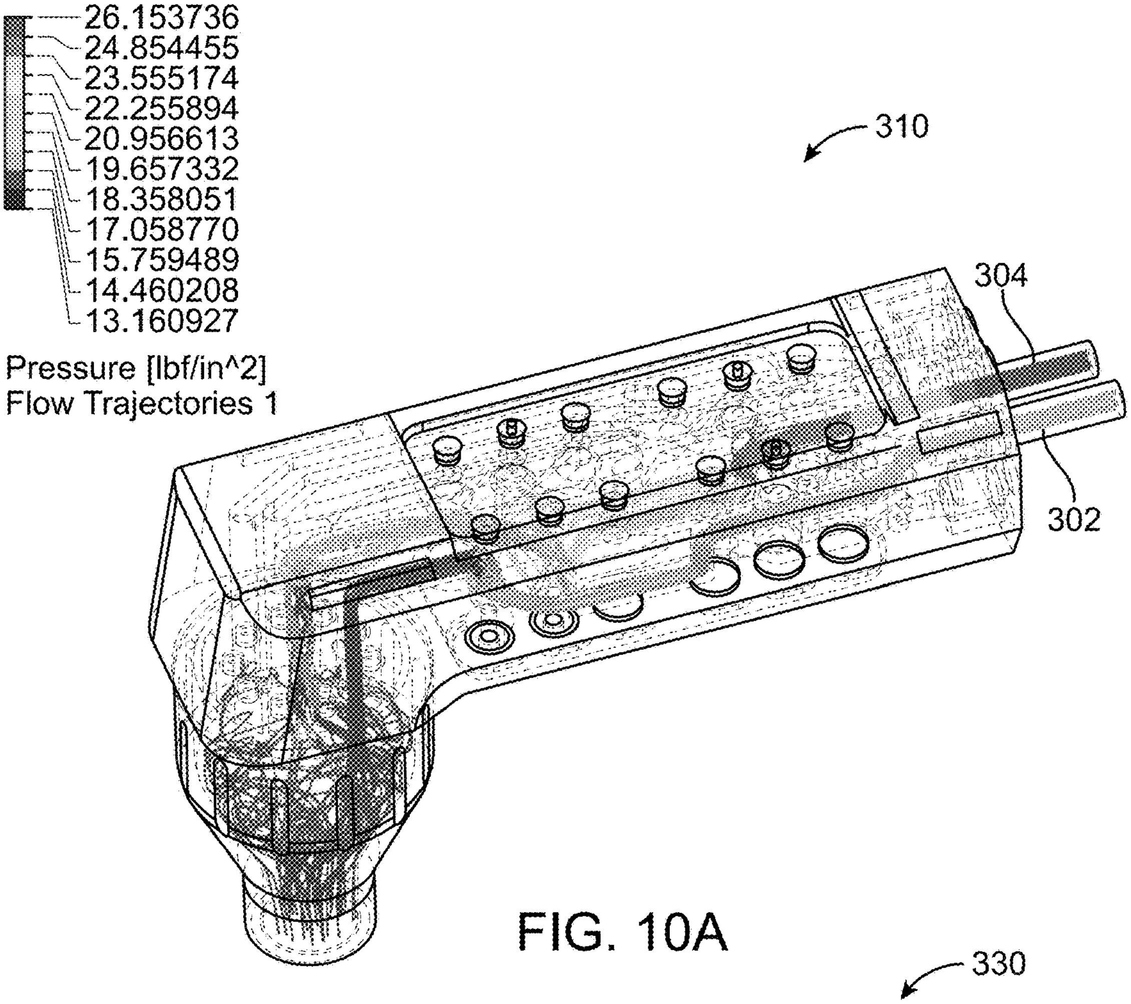
FIGS. 10A-10B illustrate a first pressure trajectory inside a handle of an exemplary beverage dispenser including 4-level flow tracks for a mixing fluid and a first type of base fluid, according to various embodiments.
Figure 10B:
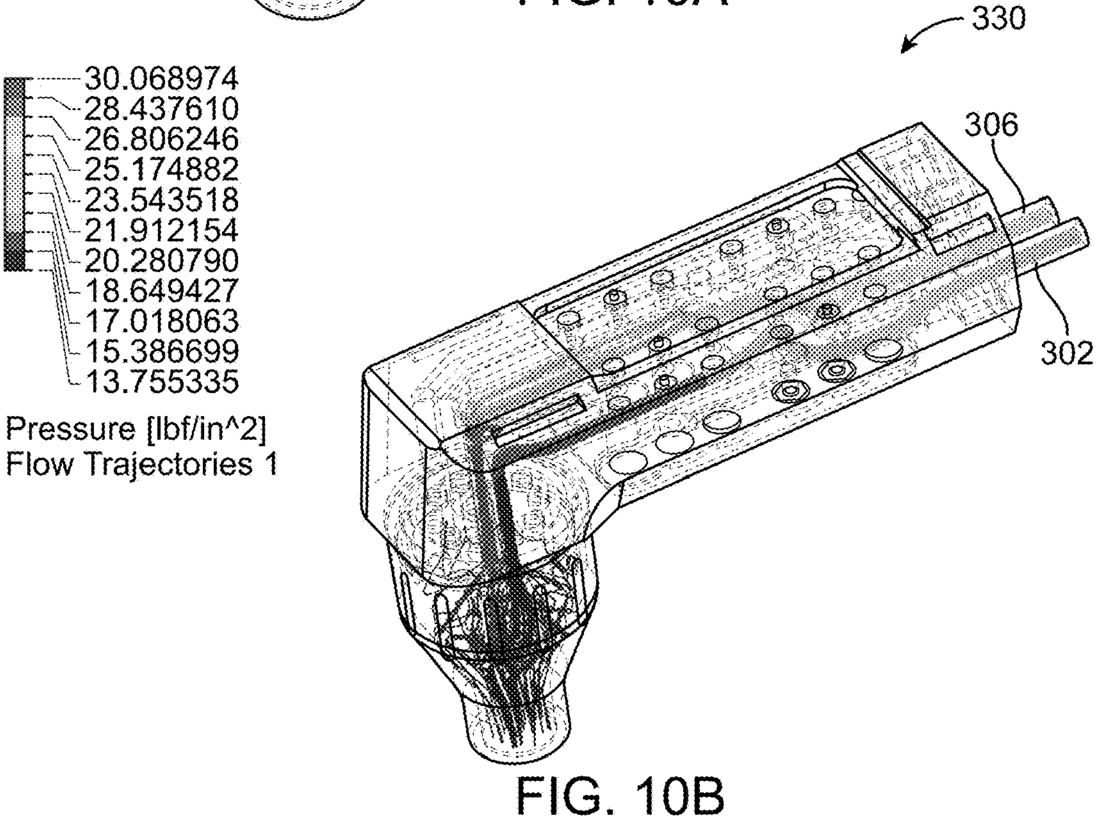

FIG. 10A illustrates a first pressure trajectory 320 inside a handle of an exemplary beverage dispenser including 4-level flow tracks for a mixing fluid (e.g., syrup) 302 and a first type of base fluid (e.g., soda) 304, according to various embodiments. FIG. 10B illustrates a second pressure trajectory 330 inside a handle of an exemplary beverage dispenser including 5-level flow tracks for a mixing fluid (e.g., syrup) 302 and a second type of base fluid (e.g., water) 304, according to various embodiments. According to various embodiments, the 4-level flow tracks illustrated in FIGS. 10A-10B result in 92% of total flowrate increase compared to the 5-level flow tracks illustrated in FIGS. 9A-9B. Experiments conducted using both flow track structures are illustrated in Table 1:

TABLE 1

| Model | Syrup and soda Mass flowrate at outlet [oz/s] | Syrup and water Mass flowrate at outlet [oz/s] |
|---|---|---|
| Using 5-level flow tracks | 1.59 | 1.84 |
| Using 4-level flow tracks | 2.53 | 2.39 |

Figure 11A:
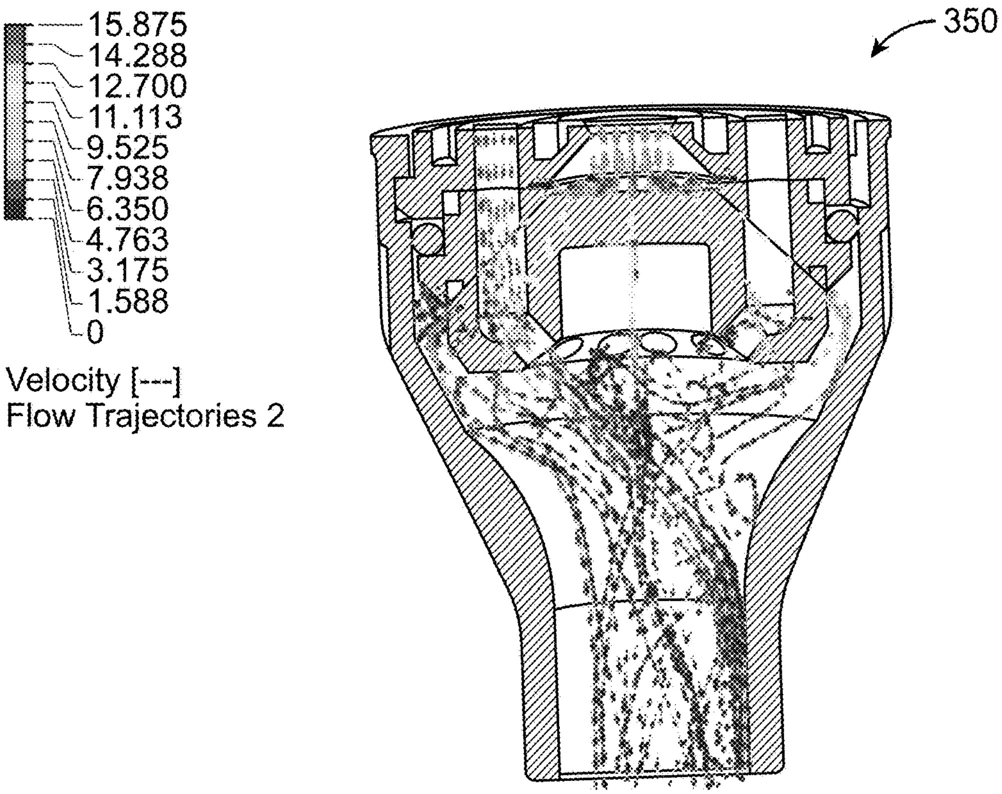
FIGS. 11A-11B illustrate the circulation of the fluids within the nozzle module of the beverage dispenser, according to various embodiments.
Figure 11B:
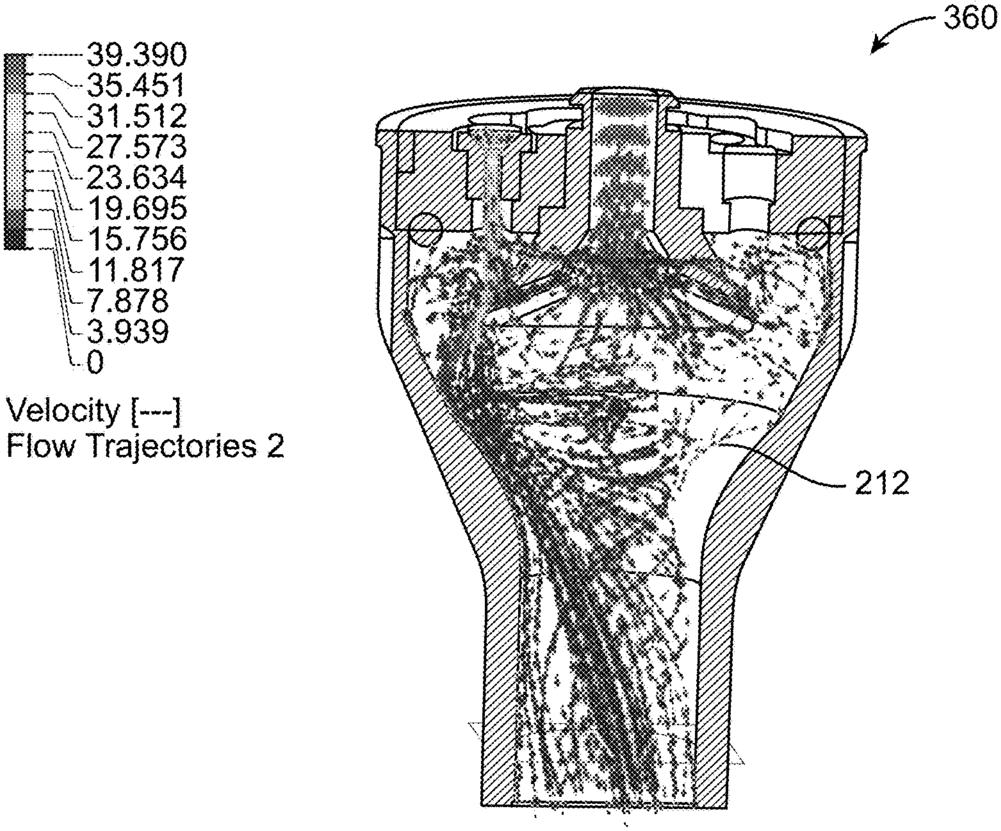

FIGS. 11A-11B illustrate the circulation of the fluids within the nozzle module of the beverage dispenser, according to various embodiments. The first configuration 350 illustrates a conventional diffuser that provides some level of circulation inside the nozzle because of the angle of the diffuser. The second configuration 360 illustrates a nozzle module 260 according to the embodiments described herein, that provides substantially more and better circulation in the nozzle module 260 resulting in much better mixing of the base fluid and the mixing fluid(s) at the tip of the nozzle 214. By changing the mixing fluid and the base fluid discharge orientation at the diffuser base 410 and the water diffuser 400, respectively, and spraying the mixing fluid below the base fluid discharge using the elongated diffuser flow inserts 216, embodiments obtain better mixing within the nozzle module 260.

Figure 12A:
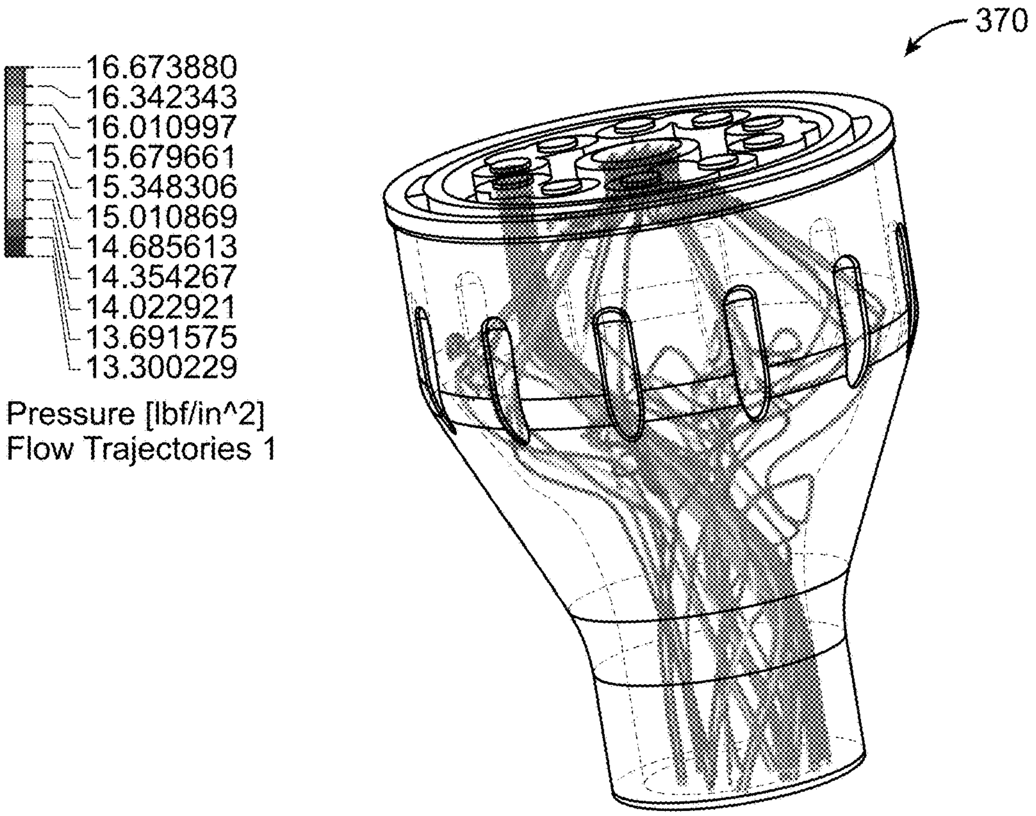
FIGS. 12A-12B illustrate the pressure trajectory through the nozzle module of the beverage dispenser, according to various embodiments.
Figure 12B:
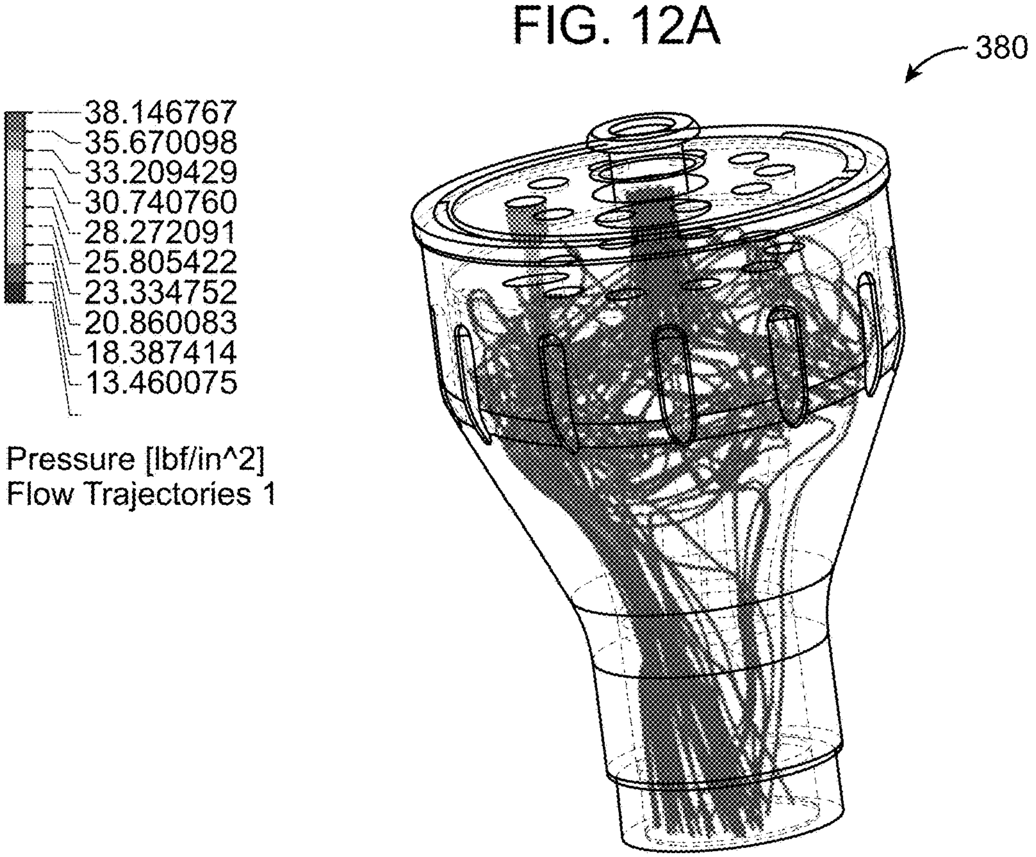

FIGS. 12A-12B illustrate the pressure trajectory through the nozzle module of the beverage dispenser, according to various embodiments. The first configuration 370 illustrates a first nozzle module and the second configuration 380 illustrates a second nozzle module according to the embodiments described herein. As shown, moving the mixing fluid discharge outlet to the diffuser shifts the pressure loss from the manifold outlet to the diffuser inlet. Reducing the surface area at the mixing fluid inlet results in an increase in the inlet pressure.

Tube Collector

Embodiments further provide a tube collector that is configured to be releasably coupled to a manifold. When portions of the tube collector and/or the manifold need to be serviced, they could easily be decoupled from each other. The manifold may in turn be coupled to a plurality of fluid sources. Accordingly, the tube collector may effectively couple the plurality of fluid sources to a beverage dispenser, such as beverage dispenser 100, 200 described herein.

Figure 13:
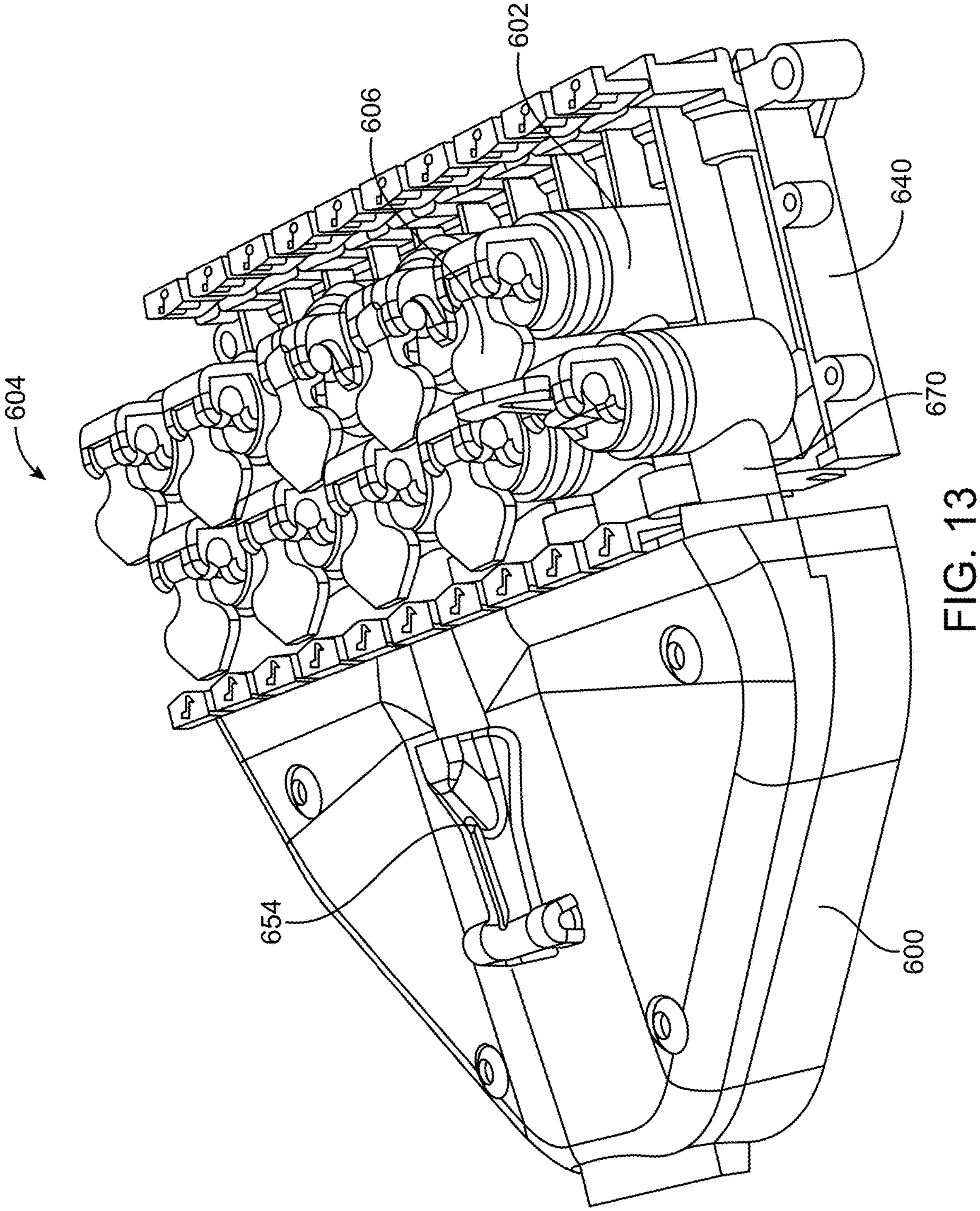
FIG. 13 illustrates a mechanism including a tube collector and a manifold, according to various embodiments.

FIG. 13 illustrates a mechanism including a tube collector and a manifold, according to various embodiments. The tube collector 600 may be releasably coupled to a manifold 604 seated on a manifold tray 640, thereby forming a tube collector mechanism. Therefore, when portions of the tube collector 600 and/or the manifold 604 need to be serviced, they could easily be decoupled from each other. The tube collector 600 may include a handle 654 that, when operated, may release the tube collector 600 and the manifold 604 (seated on the manifold tray 640) from each other.

The manifold 604 may in turn be coupled to a plurality of fluid sources. Accordingly, the tube collector 600 may effectively couple the plurality of fluid sources to a beverage dispenser (e.g., the beverage dispenser 100, 200, also referred as a "bar gun"). The manifold 604 may be a multi-gauge manifold including a plurality of continuous flow valves (CFV) 602 that provide a constant rate of fluid flow at a preset pressure. A toggle 606 may be coupled to each CFV 602 to turn the respective CFV 602 on or off. The CFV 602 may run at a full throttle where the fluid comes through unrestricted, but the CFV 602 still regulates the pressure using a spring and baffle system.

The manifold 604 may include a plurality of fixed orifices 608. According to various embodiments, the orifices 608 may have different sizes, dimensions and/or openings to accommodate the different mixing ratios for different flavor profiles of the beverages dispensed using the beverage dispenser described herein. The plurality of CFVs 602 regulate pressure so that there is a fixed pressure on the output of the manifold 604. For the base fluid (e.g. water, soda), the pressure may be set at about 100 psi coming in, and the mixing fluids (e.g. additive, syrup) may come in at 50 to 60 psi, which is then regulated through a corresponding CFV 602 such that the pressure of the mixing fluid is about 30 psi at an inlet port 704 of the handle 208 of the beverage dispenser 200.

Figure 14:
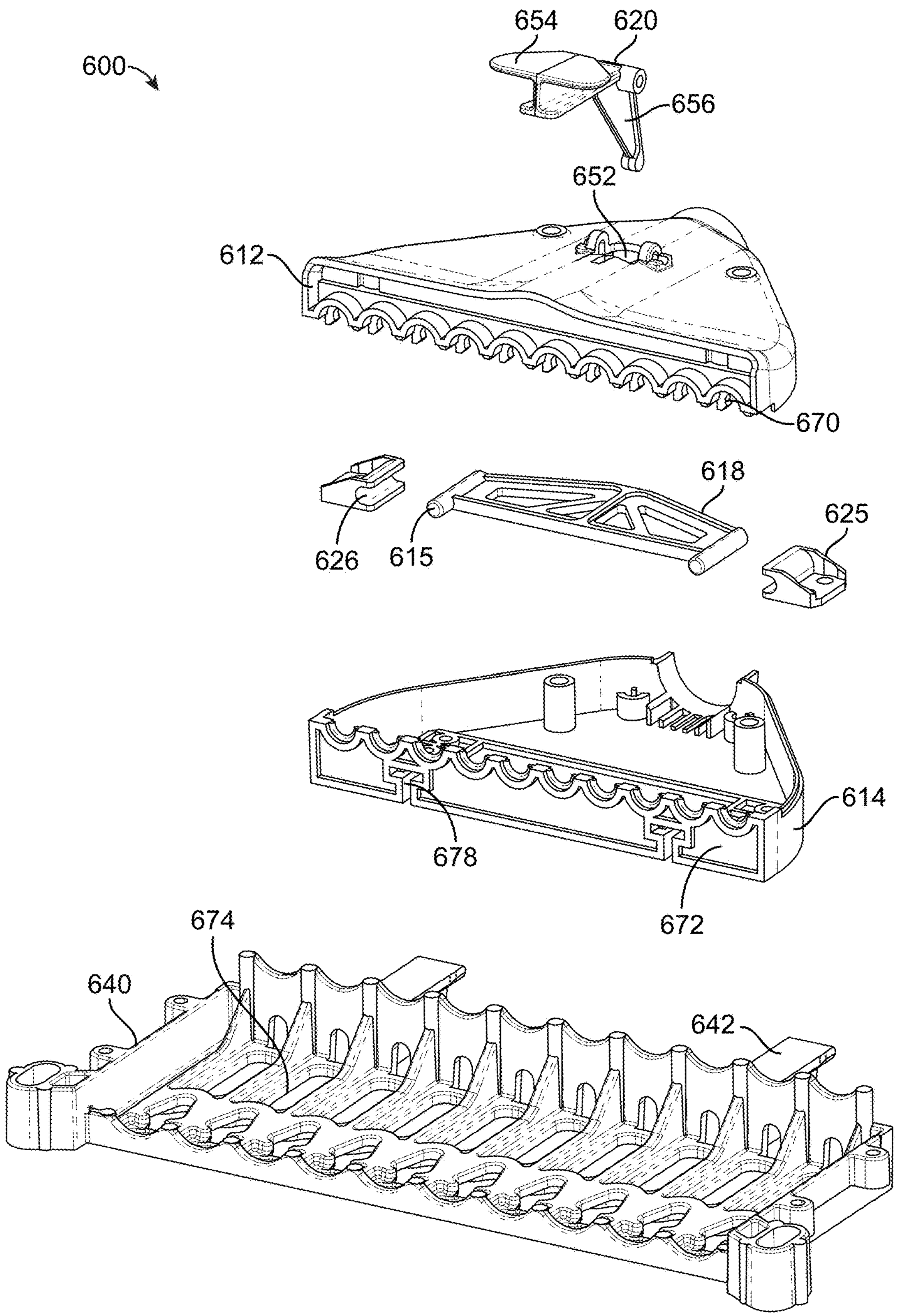
FIG. 14 illustrates an exploded view of a tube collector, according to various embodiments.

FIG. 14 illustrates an exploded view of a tube collector, according to various embodiments. The tube collector 600 includes an angular housing that has a top cover 612 and a base cover 614 that enclose a release mechanism 618 therebetween. According to various embodiments, the release mechanism 618 may be an elongated frame extending parallel to the top cover 612 and the base cover 614. The release mechanism 618 may include arms 615 extending at opposite sides of the release mechanism 618. The arms 615 may be configured to slide back and forth along or within a set of guide rails 625.

The top cover 612 of the tube collector 600 may include a plurality of concave slots 670 and the base cover 614 may include a plurality of convex slots 672. The concave slots 670 and the convex slots 672 form a plurality of openings configured to receive a plurality of tubes extending between one or more fluid sources and a manifold 604 that may be releasably coupled to the tube collector 600.

A lever 620 may include a handle 654 provided above the top cover 612 of the angular housing, and a guide arm 656 that extends through an opening 652 on the top cover 612 of the angular housing. The guide arm 656 of the lever 620 is coupled to the release mechanism 618. The lever 620 and the release mechanism 618 form a disconnect mechanism that, when activated, moves forward extending away from a front end of the tube collector 600. The lever 620 and the release mechanism 618 may form a quick disconnect mechanism.

The handle 654 may be pulled up and/or backward to release the tube collector 600 from a manifold 604 (releasably coupled to a manifold tray 640) coupled to the tube collector 600. The manifold tray 640 may include a plurality of manifold slots 671 extending parallel to each other. The manifold slots 671 may receive the manifolds 604 therein. The manifold tray 640 may be releasably coupled to a front end of the tube collector 600. The disconnect mechanism, when activated, disconnects the tube collector 600 from the manifold tray 640 by pushing the manifold tray 640 or the tube collector 600 away from each other. For example, one or more tabs 642 may provided on a first end of the manifold tray 640. The tabs 642 may extend through one or more tab slots 678 provided on the base cover 614 of the tube collector 600 to connect with (e.g., abut against, be in physical contact with) the release mechanism 618. The release mechanism 618, when activated, pushes against the one or more tabs 642 to disconnect the tube collector 600 from the manifold tray 640.

According to various embodiments, the release mechanism 618 may be activated using the handle 654. When pulled, the handle 654 moves the release mechanism 618 along guide rails 625, the end protruding portions 626 of the guide rail 625 would push against the tabs 642 of the manifold tray 640 (shown in FIG. 16D) to decouple the tube collector 600 from the manifold 604. During the decoupling movement, the release mechanism 618 slides along the set of guide rails 325 parallel to the top cover 612 and the base cover 614 of the tube collector 600. This decoupling movement is illustrated as a 3-figure series in FIG. 17 (illustrating the tube collector 600 in a fully assembled state) and FIG. 18 (illustrating the tube collector 600 without the top cover 612 so that the release mechanism 618 is shown).

Figure 15A:
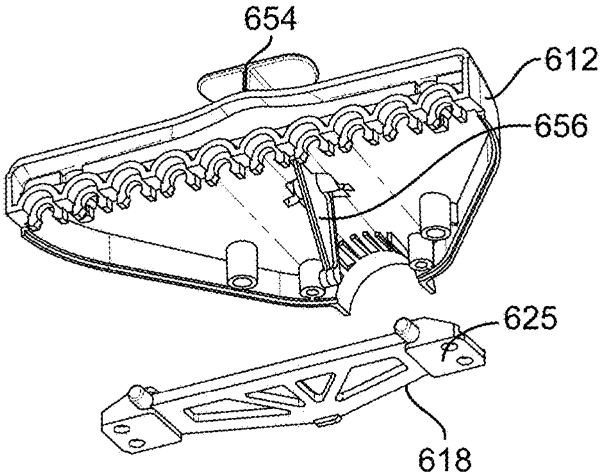
FIGS. 15A-15B illustrate the top cover and the release mechanism of the tube collector, according to various embodiments.
Figure 15B:
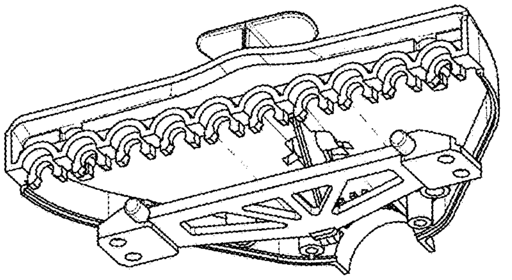

FIGS. 15A-15B illustrate the top cover and the release mechanism of the tube collector, according to various embodiments. The handle 654 of the lever 620 may be provided above the top cover 612 extending parallel to, and at a distance from, the top cover 612. The guide arm 656 extends through an opening 652 on the top cover 612 and couples to the release mechanism 618. For example, the guide arm 656 may couple to a rear end of the release mechanism 618. When the handle 654 is pulled on, the guide arm 656 pushes the release mechanism 618 forward along the guide rails 625. The release mechanism 618 moves forward parallel to, and away from, the top cover 612.

Figure 15C:
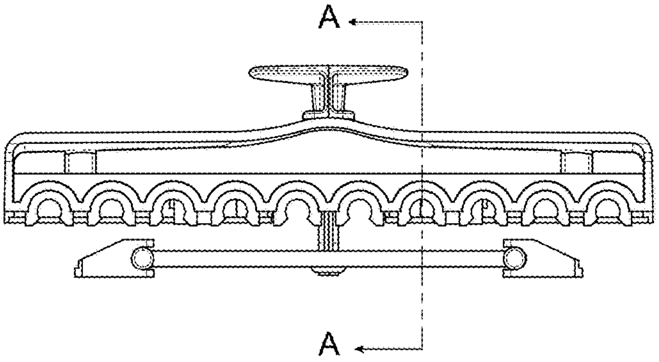
FIGS. 15C, 15D, and 15E illustrate an open and a closed position of the handle of the tube collector, according to various embodiments.
Figure 15D:
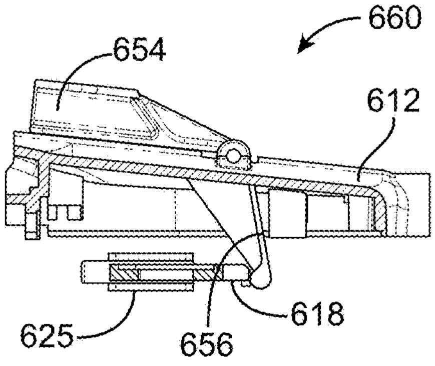
Figure 15E:
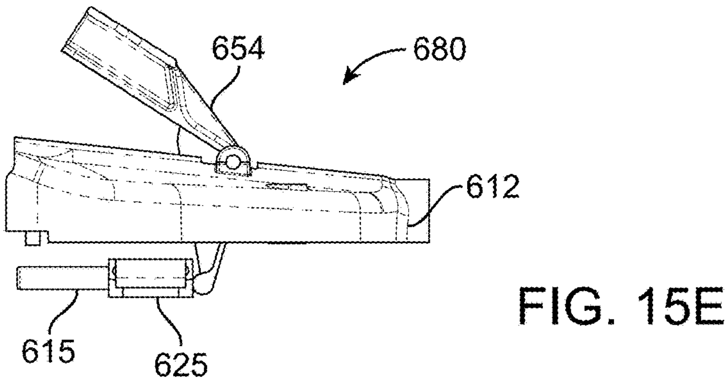
Figure 16A:
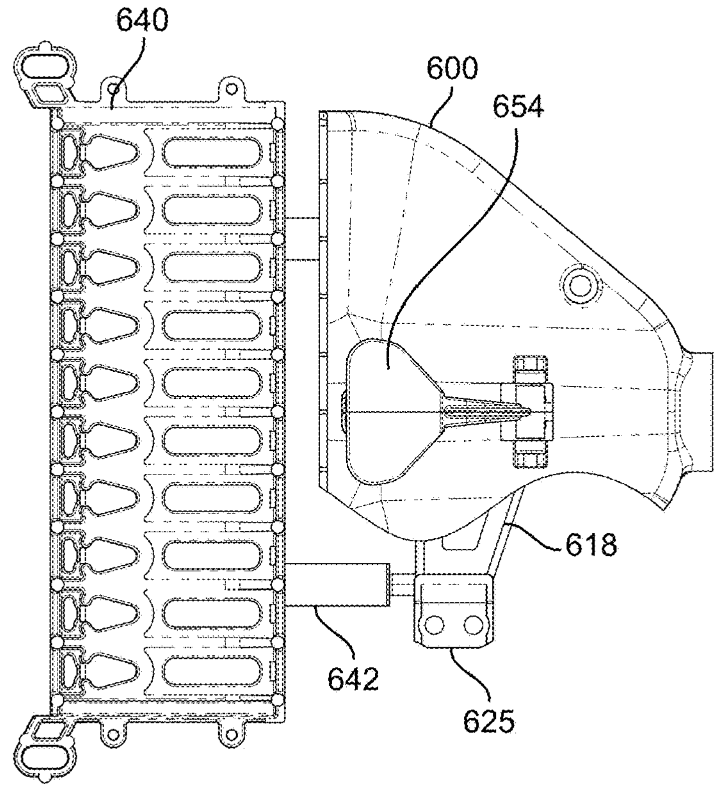
FIGS. 16A-16B illustrate the tube collector and the manifold tray in a coupled position, according to various embodiments.
Figure 16B:
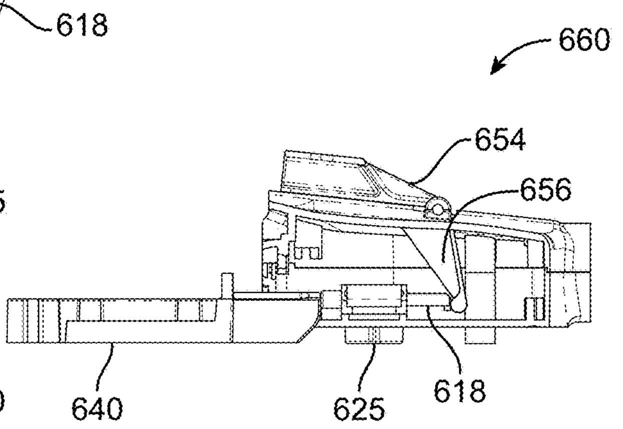
Figure 16C:
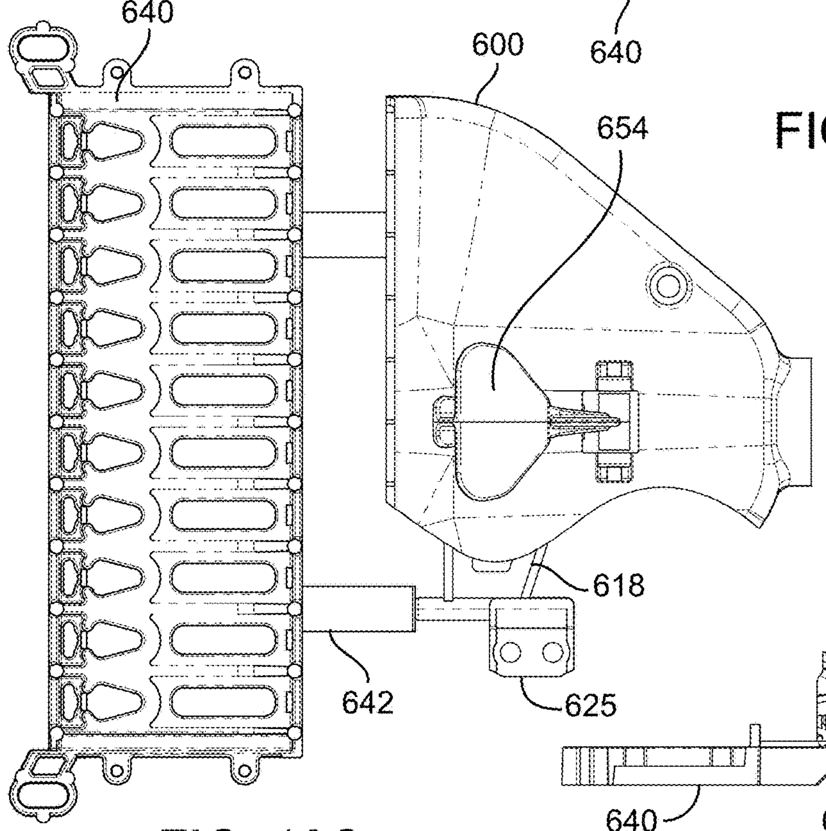
FIGS. 16C-16D illustrate the tube collector and the manifold tray in a decoupled position, according to various embodiments.
Figure 16D:
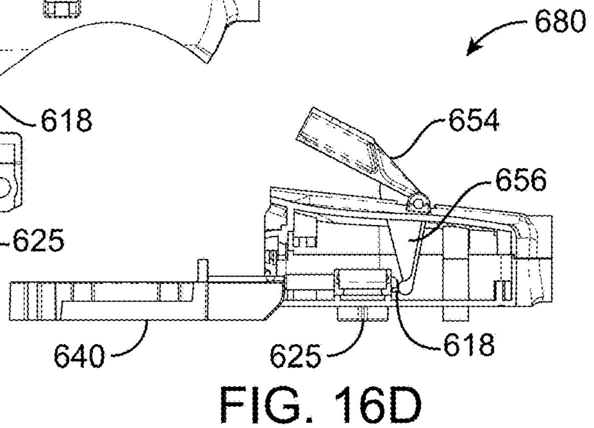

FIGS. 15C-15E illustrate a side view of the tube collector 600 with an open position 680 and a closed position 660 of the handle 654. FIGS. 16A-16B illustrate the tube collector 600 and the manifold tray 640 in a coupled position, when the handle 654 is in the closed position 660. FIGS. 16C-16D illustrate the tube collector 600 and the manifold tray 604 in a decoupled position, when the handle 654 is in the open position 680. When the handle 654 transitions from the closed position 660 to the open position 680, the guide arm 656 pushes the release mechanism 618 parallel to, and away from, the top cover.

FIGS. 15D and 16B illustrate the handle 654 in a closed position 660 where the handle 654 extends parallel to, and at a distance from, the top cover 612. When the handle is in the closed position 660, the disconnect mechanism is in a retracted position where the guide arm 656 is in a retracted or neutral position, and the release mechanism 618 rests in a retracted position, with a portion behind the guide rails 625.

FIGS. 15E and 16D illustrates the handle 654 in an open position 680 where the handle 654 is pulled up and/or back, and rests at an angle to the top cover 612. When the handle is in the open position 680, the disconnect mechanism is in an activated position where the guide arm 656 is in an extended position, and the release mechanism 618 moves forward along the guide rails 625 with a large portion ahead of the guide rails 625. When the handle is replaced in the closed position 660, the components of the tube collector assume their position in FIGS. 15D and 16B. That is, the tube collector 600 (and all its components) is configured to move between the closed position 660 and the open position 680 of the handle 654.

Figure 17A:
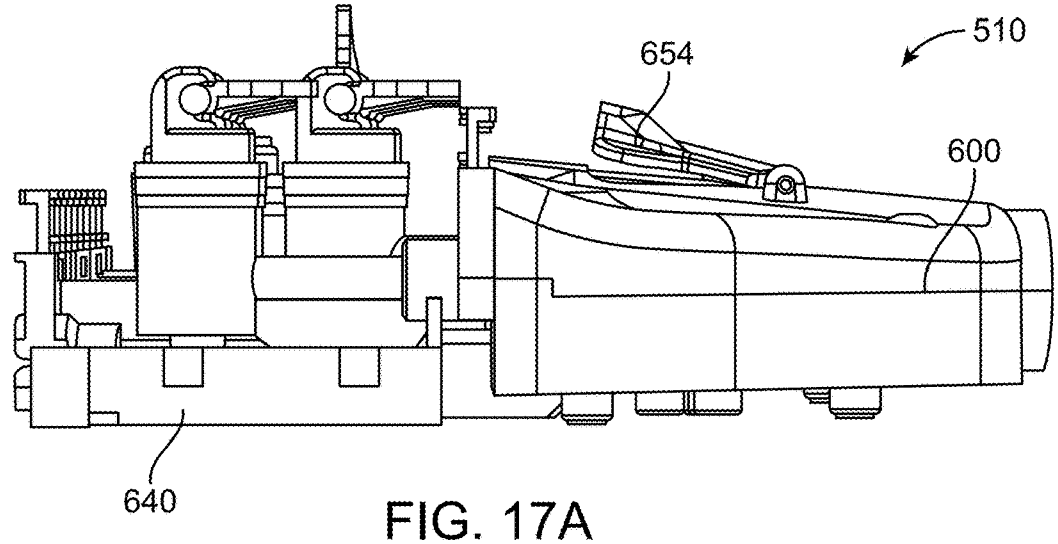
FIGS. 17A, 17B and 17C illustrate a decoupling movement between the tube collector and the manifold tray in three positions, according to various embodiments.
Figure 17B:
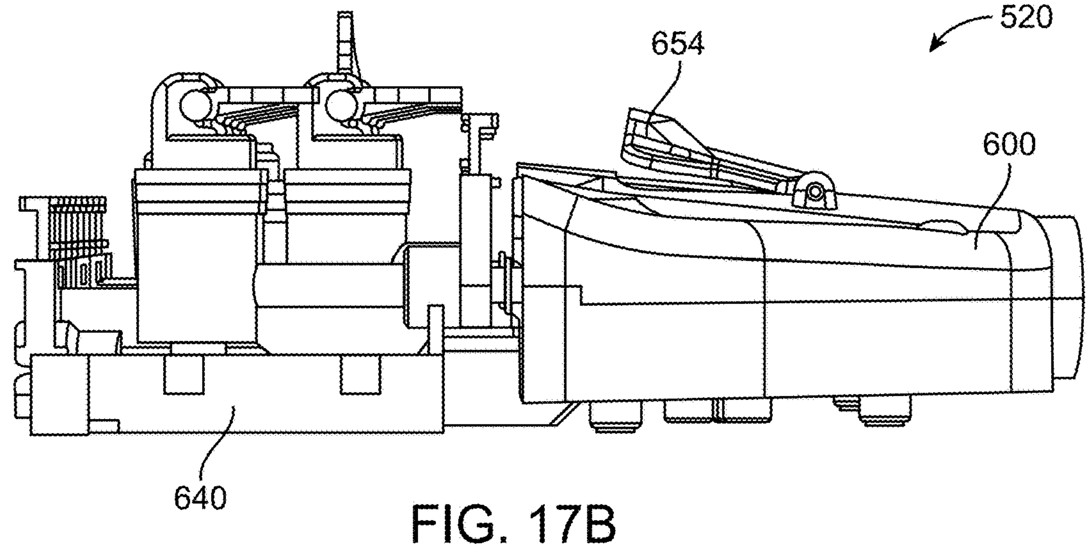
Figure 17C:
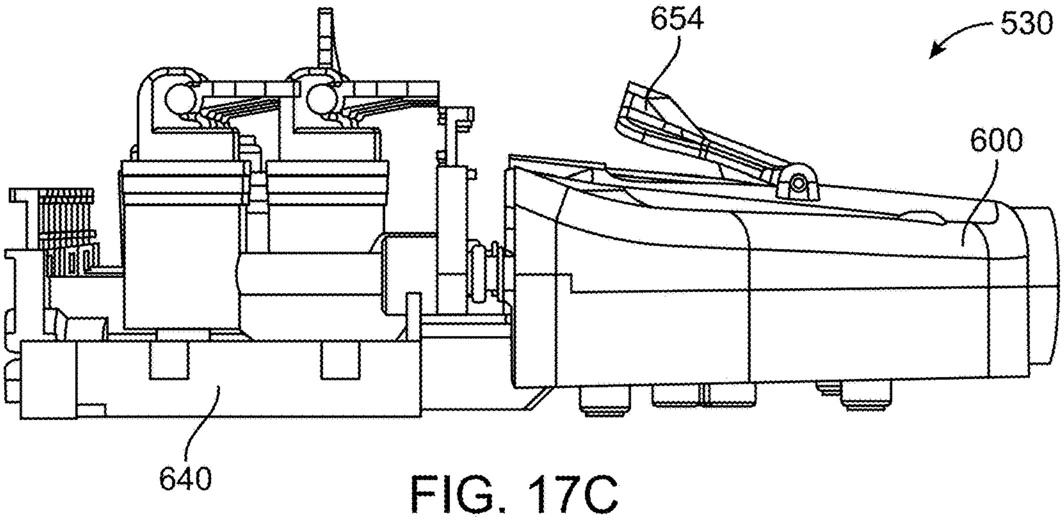
Figure 18A:
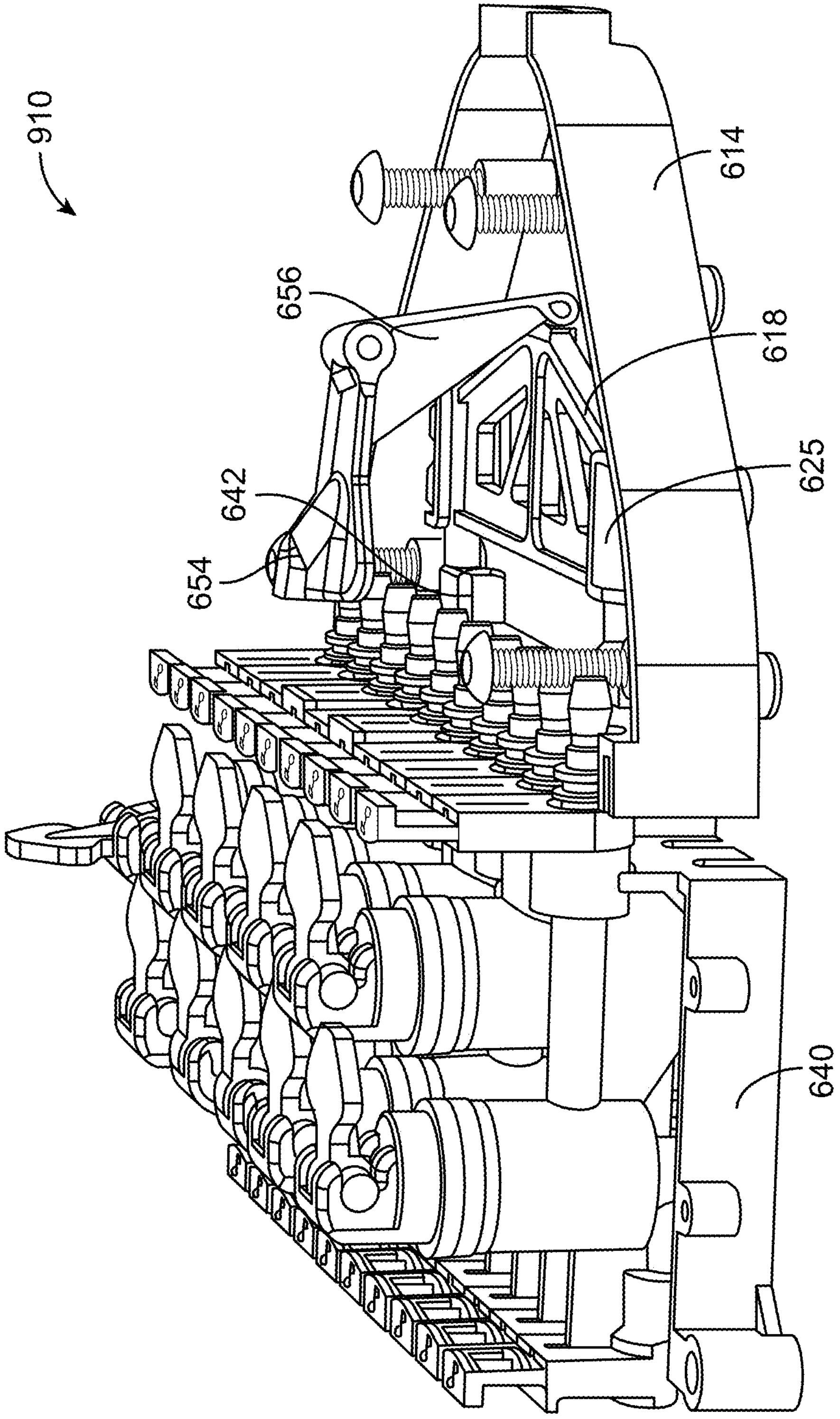
FIGS. 18A, 18B, and 18C illustrate a decoupling movement between the tube collector without the top cover and the manifold tray in three positions, according to various embodiments.
Figure 18B:
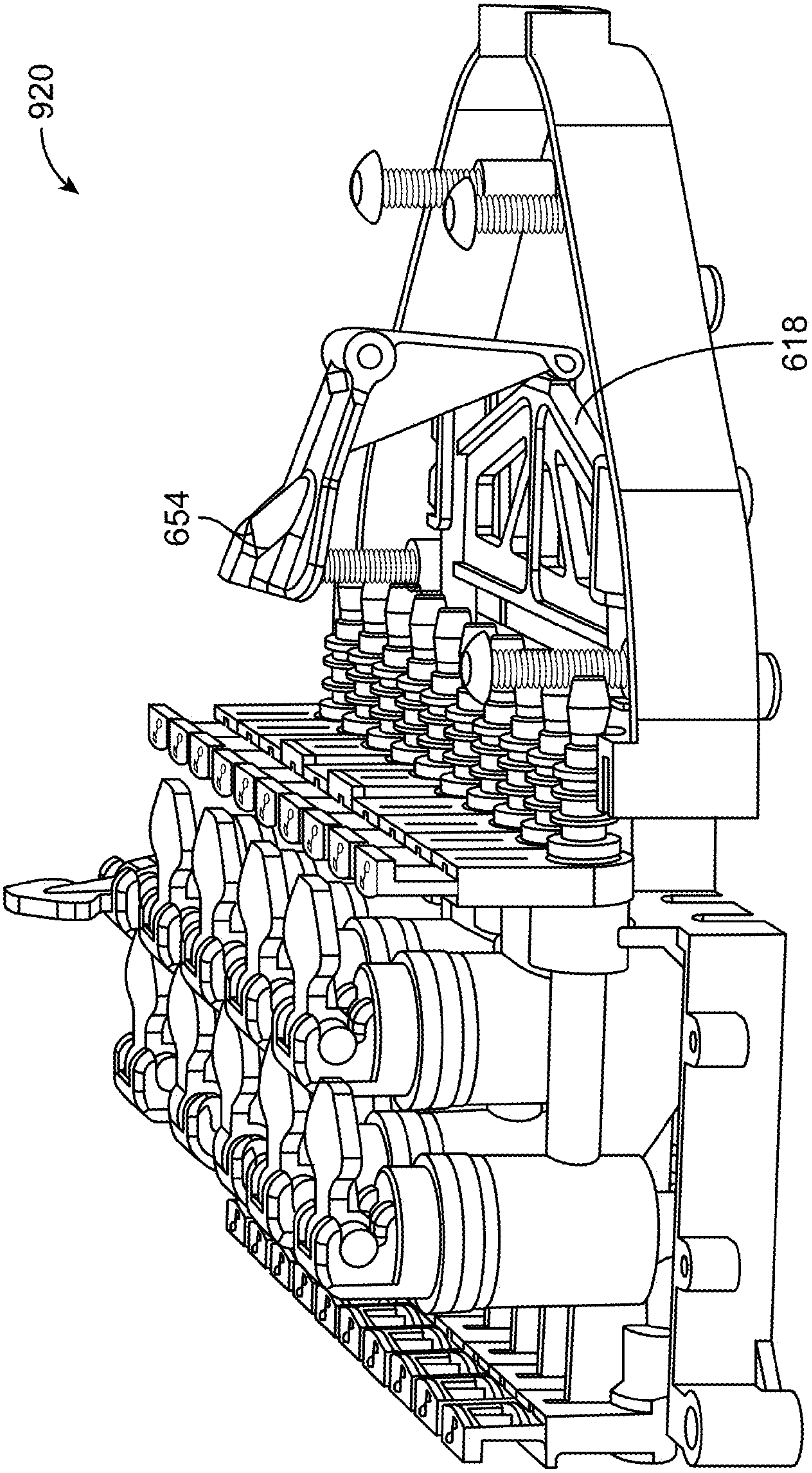
Figure 18C:
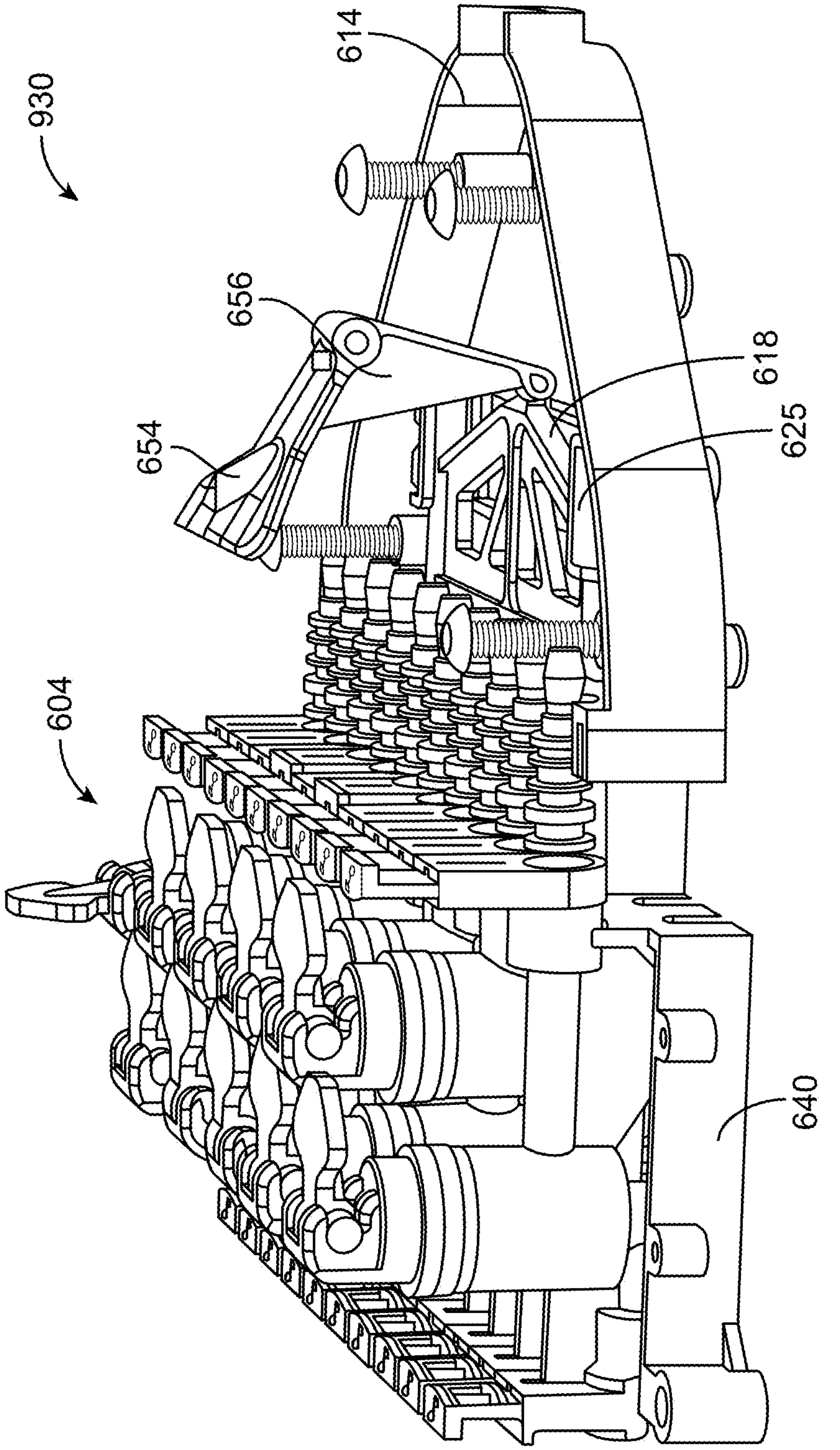

FIGS. 17A, 17B, 17C illustrate a decoupling movement between the tube collector and the manifold tray in three positions, according to various embodiments. FIGS. 18A, 18B, 18C correspond to FIGS. 17A, 17B, 17C, respectively, and illustrate the decoupling movement between the tube collector without the top cover (to better illustrate the decoupling movement) and the manifold tray in three positions, according to various embodiments.

In the first position 510 of FIG. 17A (and corresponding first position 910 of FIG. 18A), the handle 654 is in the closed position 660. The manifold tray 640 is coupled to the tube collector 600.

In the second position 520 of FIG. 17B (and corresponding second position 920 of FIG. 18B), the handle 654 is in transition from the closed position 660 and the open position 680. The manifold tray 640 starts to get pushed away from the tube collector 600. The tabs 642 are being pushed upon by the arms 615 of the release mechanism 618.

In the third position 530 of FIG. 17C (and corresponding second position 930 of FIG. 18C), the handle 654 is in the open position 680. The manifold tray 640 is pushed away from the tube collector 600, and decoupled from the tube collector 600. The manifold tray 640 can be taken away for servicing the manifold tray 640 and/or the manifolds 604.

Embodiments provide a beverage dispensing system that is modular for ease of repair and maintenance, that provides a flow rate f at least 2.5 oz/sec. at the outlet, that provides improved carbonation, as well as reduced foaming and stratification. The beverage dispensing system includes 4 or 5-layer of flow tracks in the handle portion that allow for improved dispensing properties.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. A modular beverage dispenser comprising:
- a handle enclosing a plurality of flow tracks and including a dispensing surface comprising a handle base fluid outlet;
- a flow control module coupled to a top surface of the handle, the flow control module includes a plurality of buttons configured to control flow through one or more of the plurality of flow tracks to form a beverage; and
- a nozzle module coupled to the dispensing surface of the handle, the nozzle module including:
  - a nozzle including an opening for dispensing the beverage, and
  - a diffuser assembly provided within a cavity of the nozzle, wherein the diffuser assembly includes:
    - a diffuser base permanently attached to the dispensing surface of the handle, and
    - a water diffuser seated into the handle base fluid outlet through the diffuser base, the water diffuser comprising:
    - an elongated neck configured to fit into a central opening of the diffuser base;
    - an inner channel extending through the elongated neck; and
    - an anti-drip gasket provided above an end of the inner channel opposite from an inlet connecting the handle base fluid outlet to the inner channel, wherein a plurality of channels fluidly connected to the inner channel are provided downstream from the anti-drip gasket,
    - wherein the anti-drip gasket is configured to prevent dripping from the water diffuser.

2. The modular beverage dispenser of claim 1, wherein the water diffuser comprises:
- a first tapered surface provided at a first end of the elongated neck;
- a second tapered surface provided below the first tapered surface; and
- a set of angled outlets configured dispense water, provided along the first tapered surface.

3. The modular beverage dispenser of claim 2, further comprising:
- a recess provided below a second end of the elongated neck, wherein the recess is received within the handle base fluid outlet.

4. The modular beverage dispenser of claim 2, further comprising:
- an inlet provided at a second end of the elongated neck, wherein the inlet connects the handle base fluid outlet to the inner channel, wherein the inner channel extends between the inlet and the set of angled outlets.

5. The modular beverage dispenser of claim 2, further comprising:
- wherein the plurality of channels extend at an angle between the inner channel and the set of angled outlets, wherein the plurality of channels transport water from the inner channel to the set of angled outlets.

6. The modular beverage dispenser of claim 1, wherein the plurality of flow tracks are distributed among four or more levels layered on top of each other within the handle.

7. The modular beverage dispenser of claim 1, wherein the nozzle dispenses the beverage at a flow rate of at least 2.5 ounces per second.

8. The modular beverage dispenser of claim 1, further comprising:
- a plurality of handle outlets provided on the dispensing surface of the handle, the plurality of handle outlets including the handle base fluid outlet;
- a plurality of tube subassemblies each coupled to an inlet port of a flow track provided at an end of each one of the plurality of flow tracks, wherein each flow track of the plurality of flow tracks extends between the inlet port and a handle outlet of the plurality of handle outlets, wherein each tube subassembly is configured to carry a beverage component through the handle to corresponding handle outlet; and
- a split heel cover coupled to a rear end of the handle, opposite from the nozzle module, wherein the split heel cover is provided at around at least a portion of the plurality of tube subassemblies.

9. The modular beverage dispenser of claim 1, further comprising:
- a plurality of handle outlets provided around the handle base fluid outlet;
- a plurality of diffuser channels arranged around a central opening of the diffuser base, wherein each diffuser channel extends between a diffuser inlet and a diffuser outlet, wherein each diffuser inlet is in fluid connection with a handle outlet of the plurality of handle outlets; and
- a plurality of elongated diffuser flow inserts, wherein each elongated diffuser flow insert is provided within a diffuser channel of the diffuser base,
- wherein the plurality of elongated diffuser flow inserts extend around the water diffuser within an internal cavity of the nozzle.

10. The modular beverage dispenser of claim 9, wherein the plurality of elongated diffuser flow inserts extend past a bottom surface of the water diffuser such that an output of the plurality of elongated diffuser flow inserts is downstream from an output of the water diffuser.

11. The modular beverage dispenser of claim 1, wherein the water diffuser is removably coupled to the diffuser base.

12. A modular beverage dispenser comprising:
- a handle including a dispensing surface comprising a handle base fluid outlet; and
- a nozzle module coupled to the dispensing surface of the handle, the nozzle module including:
  - a nozzle including an opening for dispensing a beverage, and
  - a diffuser assembly provided within a cavity of the nozzle, wherein the diffuser assembly includes:
    - a diffuser base permanently attached to the dispensing surface of the handle, and a water diffuser seated into the handle base fluid outlet through the diffuser base, the water diffuser comprising:

an elongated neck configured to fit into a central opening of the diffuser base;

an inner channel extending through the elongated neck; and an anti-drip gasket provided above an end of the inner channel opposite from an inlet connecting the handle base fluid outlet to the inner channel, wherein a plurality of channels fluidly connected to the inner channel are provided downstream from the anti-drip gasket, wherein the anti-drip gasket is configured to prevent dripping from the water diffuser.

13. The modular beverage dispenser of claim 12, wherein the nozzle dispenses the beverage at a flow rate of at least 2.5 ounces per second.

14. The modular beverage dispenser of claim 12, wherein the water diffuser is removably coupled to the diffuser base.

* * * * *